(12) United States Patent
Shaikh et al.

(10) Patent No.: US 10,449,968 B2
(45) Date of Patent: Oct. 22, 2019

(54) METHODS AND APPARATUS FOR ADAPTIVELY ASSISTING DEVELOPMENTALLY DISABLED OR COGNITIVELY IMPAIRED DRIVERS

(71) Applicant: Ford Motor Company, Dearborn, MI (US)

(72) Inventors: Furqan Zafar Shaikh, Troy, MI (US); Damian Porcari, Canton, MI (US); Deborah Frances Mielewski, Ann Arbor, MI (US); Jeff Allen Greenberg, Ann Arbor, MI (US)

(73) Assignee: FORD MOTOR COMPANY, Dearborn, MI (US)

( * ) Notice: Subject to any disclaimer, the term of this patent is extended or adjusted under 35 U.S.C. 154(b) by 20 days.

(21) Appl. No.: 15/675,424

(22) Filed: Aug. 11, 2017

(65) Prior Publication Data

US 2018/0086347 A1 Mar. 29, 2018

Related U.S. Application Data

(60) Provisional application No. 62/398,657, filed on Sep. 23, 2016.

(51) Int. Cl.
*G06F 3/0482* (2013.01)
*B60W 40/09* (2012.01)
(Continued)

(52) U.S. Cl.
CPC .......... *B60W 40/09* (2013.01); *B60W 50/087* (2013.01); *B62D 6/007* (2013.01);
(Continued)

(58) Field of Classification Search
CPC ................................................... G06F 3/0482
(Continued)

(56) References Cited

U.S. PATENT DOCUMENTS 5,598,167 A * 1/1997 Zijderhand ............ G01C 21/26
342/457
5,813,989 A 9/1998 Saitoh et al.
(Continued)

FOREIGN PATENT DOCUMENTS

| CN | 103839379 | 6/2014 |
|---|---|---|
| CN | 104183091 | 12/2014 |
| WO | 2013132961 | 9/2013 |

OTHER PUBLICATIONS

Autism Speaks, "Autism and Driving: Study Opens Research into Unmet Needs of Adults," dated Jun. 30, 2014, retrieved from [https://www.autismspeaks.org/science/science-new/autism-and-driving-opens-research-unmet-needs-adults] on Sep. 20, 2016, 8 pages.

(Continued)

*Primary Examiner* — Daniel Rodriguez
(74) *Attorney, Agent, or Firm* — Brandon Hicks; Hanley, Flight & Zimmerman, LLC

(57) ABSTRACT

Methods and apparatus for adaptively assisting developmentally disabled or cognitively impaired drivers are disclosed. An apparatus comprises a user interface. The user interface is to present first navigation data in a first mode to assist a driver in guiding a vehicle from a current location to a destination location. The user interface is further to present second navigation data in a second mode to assist the driver in guiding the vehicle from the current location to the destination location. The second navigation data is adapted relative to the first navigation data based on driver assistance data associated with the driver.

20 Claims, 6 Drawing Sheets

(51) Int. Cl.
*B60W 50/08* (2012.01)
*B62D 6/00* (2006.01)
*G06F 3/0484* (2013.01)
*G01C 21/36* (2006.01)
*G01C 21/34* (2006.01)

(52) U.S. Cl.
CPC ..... *G01C 21/3453* (2013.01); *G01C 21/3626* (2013.01); *G06F 3/0482* (2013.01); *G06F 3/04842* (2013.01); *B60T 2220/02* (2013.01)

(58) Field of Classification Search
USPC .......................................................... 715/865
See application file for complete search history.

(56) References Cited

U.S. PATENT DOCUMENTS

| | | | |
|---|---|---|---|
| 8,577,593 B2 | 11/2013 | Oesterling et al. | |
| 9,124,955 B2 | 9/2015 | Geva et al. | |
| 9,127,955 B2 | 9/2015 | Tsimhoni et al. | |
| 9,296,395 B2 | 3/2016 | Forcke et al. | |
| 9,760,827 B1* | 9/2017 | Lin | G06N 3/063 |
| 2001/0001847 A1* | 5/2001 | Hessing | G01C 21/3415 701/421 |
| 2003/0193389 A1* | 10/2003 | Nitta | B60R 16/0232 340/425.5 |
| 2006/0190825 A1* | 8/2006 | Zaag | H04M 1/72566 715/745 |
| 2007/0219672 A1* | 9/2007 | Fehr | B60W 40/08 701/1 |
| 2008/0016443 A1* | 1/2008 | Hiroshima | G01C 21/3664 715/702 |
| 2008/0052627 A1* | 2/2008 | Oguchi | B60K 35/00 715/733 |
| 2008/0178118 A1* | 7/2008 | Ishii | G01C 21/3664 715/810 |
| 2009/0164115 A1* | 6/2009 | Kosakowski | G01C 21/3641 701/533 |
| 2009/0209829 A1 | 8/2009 | Yanagidaira et al. | |
| 2010/0070932 A1* | 3/2010 | Hur | G09B 5/06 715/863 |
| 2010/0153010 A1* | 6/2010 | Huang | G01C 21/3461 701/414 |
| 2011/0018818 A1* | 1/2011 | Iwano | G01C 21/3664 345/173 |
| 2012/0135382 A1* | 5/2012 | Winston | G09B 9/04 434/65 |
| 2013/0322634 A1* | 12/2013 | Bennett | G10L 21/00 381/17 |
| 2013/0332402 A1* | 12/2013 | Rakshit | G06N 5/02 706/46 |
| 2014/0156158 A1* | 6/2014 | Matsuno | G08G 1/167 701/70 |
| 2014/0272810 A1* | 9/2014 | Fields | G09B 19/14 434/65 |
| 2015/0024347 A1* | 1/2015 | Son | G09B 9/04 434/69 |
| 2015/0081202 A1* | 3/2015 | Levin | G01C 21/3697 701/400 |
| 2015/0192426 A1* | 7/2015 | Foster | G01C 21/3629 715/765 |
| 2015/0300834 A1* | 10/2015 | Shin | G01C 21/3602 701/523 |
| 2015/0323932 A1* | 11/2015 | Paduano | G05D 1/042 701/3 |
| 2015/0345981 A1* | 12/2015 | Goldman-Shenhar | G01C 21/3629 701/533 |
| 2016/0174890 A1* | 6/2016 | Ko | A61B 5/7264 340/576 |
| 2016/0293049 A1* | 10/2016 | Monahan | G09B 19/167 |
| 2017/0106876 A1* | 4/2017 | Gordon | B60W 50/082 |
| 2017/0240183 A1* | 8/2017 | Suzuki | B60W 40/08 |
| 2017/0282717 A1* | 10/2017 | Jang | B60K 37/06 |
| 2017/0313308 A1* | 11/2017 | Tseng | B60W 30/12 |
| 2017/0343363 A1* | 11/2017 | Goldberg | G01C 21/3697 |
| 2018/0043901 A1* | 2/2018 | Kim | G16H 10/65 |
| 2018/0111617 A1* | 4/2018 | Stahl | B60W 30/143 |
| 2018/0116604 A1* | 5/2018 | Newberry | G16H 40/63 |
| 2018/0279183 A1* | 9/2018 | Song | G01C 21/28 |
| 2018/0304901 A1* | 10/2018 | Duan | G01C 21/34 |

OTHER PUBLICATIONS

Foden et al., "Rules of the Road: Driving and ASD," last revised Jun. 6, 2011, retrieved from [https://iancommunity.org/cs.adults/driving_with_asd] on Sep. 20, 2016, 4 pages.

Ross et al., "Exploring the driving behavior of youth with an autism spectrum disorder: a driver instruction questionnaire," Proceedings of the Eighth International Driving Imposium on Human Factors in Driving Assessment, Training and Vehicle Design, 7 pages.

"Julia's Story from Autistic Driving School," uploaded on Jun. 3, 2010, retrieved from [https://www.youtube.com/watch?v=S93scNE94Ho], 1 page.

* cited by examiner

METHODS AND APPARATUS FOR ADAPTIVELY ASSISTING DEVELOPMENTALLY DISABLED OR COGNITIVELY IMPAIRED DRIVERS

CROSS REFERENCE TO RELATED APPLICATION

This patent claims the benefit of U.S. Provisional Application Ser. No. 62/398,657, titled "Adaptive Vehicle Driver Assistance Features to Support Developmentally Disabled Drivers," filed Sep. 23, 2016, which is incorporated herein by reference in its entirety.

FIELD OF THE DISCLOSURE

This disclosure relates generally to methods and apparatus for assisting drivers and, more particularly, to methods and apparatus for adaptively assisting developmentally disabled or cognitively impaired drivers.

BACKGROUND

Developmental disabilities (e.g., autism spectrum disorder (ASD), Asperger's syndrome, attention deficit hyperactivity disorder (ADHD), etc.) and cognitive impairments (e.g., dementia, Alzheimer's disease, etc.) are prevalent in the United States and other countries. For example, approximately two percent (2%) of the United States population is diagnosed with autism spectrum disorder (ASD). According to the Diagnostic and Statistical Manual of Mental Disorders (DSM-5), individuals having ASD display an array of symptoms that include ongoing social problems, difficulty communicating and interacting with others, repetitive and/or compulsive behaviors, limited interests or activities, and various symptoms that impede the individual's ability to function socially, at school, at work, or in other areas of life.

Other symptoms of individuals having ASD may include: distraction by sights, sounds and smells; confusion as a result of exposure to new or unusual events; delays in processing auditory or visual instruction; mood changes as a result of exposure to unusual events or mistakes; diminished ability to communicate under difficult circumstances, such as a traffic accident or encounter with law enforcement; and difficulty in predicting time of arrival or intersection of moving objects in free space. Symptoms that are similar and/or related to those described above may be found in individuals having other types of developmental disabilities and/or cognitive impairments.

Conventional vehicle navigation systems typically provide standard and/or default routes as well as standard and/or default commands to guide a driver of a vehicle from a current location to a destination location. Individuals having developmental disabilities or cognitive impairments may experience difficulty in comprehending, following, adhering to, and/or otherwise appropriately responding to the standard and/or default routes and commands of conventional vehicle navigation systems.

SUMMARY

Methods and apparatus for adaptively assisting developmentally disabled or cognitively impaired drivers are disclosed. In some examples, an apparatus is disclosed. In some disclosed examples, the apparatus comprises a user interface. In some disclosed examples, the user interface is to present first navigation data in a first mode to assist a driver in guiding a vehicle from a current location to a destination location. In some disclosed examples, the user interface is further to present second navigation data in a second mode to assist the driver in guiding the vehicle from the current location to the destination location. In some disclosed examples, the second navigation data is adapted relative to the first navigation data based on driver assistance data associated with the driver. In some disclosed examples, the driver assistance data is based on a developmental disability or a cognitive impairment of the driver.

In some examples, a method for providing adaptive driver assistance is disclosed. In some disclosed examples, the method comprises presenting first navigation data via a user interface in a first mode to assist a driver in guiding a vehicle from a current location to a destination location. In some disclosed examples, the method further comprises presenting second navigation data via the user interface in a second mode to assist the driver in guiding the vehicle from the current location to the destination location. In some disclosed examples, the second navigation data is adapted relative to the first navigation data based on driver assistance data associated with the driver. In some disclosed examples, the driver assistance data is based on a developmental disability or a cognitive impairment of the driver.

In some examples, a non-transitory machine readable storage medium comprising instructions is disclosed. In some disclosed examples, the instructions, when executed, cause a processor to present first navigation data via a user interface in a first mode to assist a driver in guiding a vehicle from a current location to a destination location. In some disclosed examples, the instructions, when executed, further cause the processor to present second navigation data via the user interface in a second mode to assist the driver in guiding the vehicle from the current location to the destination location. In some disclosed examples, the second navigation data is adapted relative to the first navigation data based on driver assistance data associated with the driver. In some disclosed examples, the driver assistance data is based on a developmental disability or a cognitive impairment of the driver.

Figure 1:
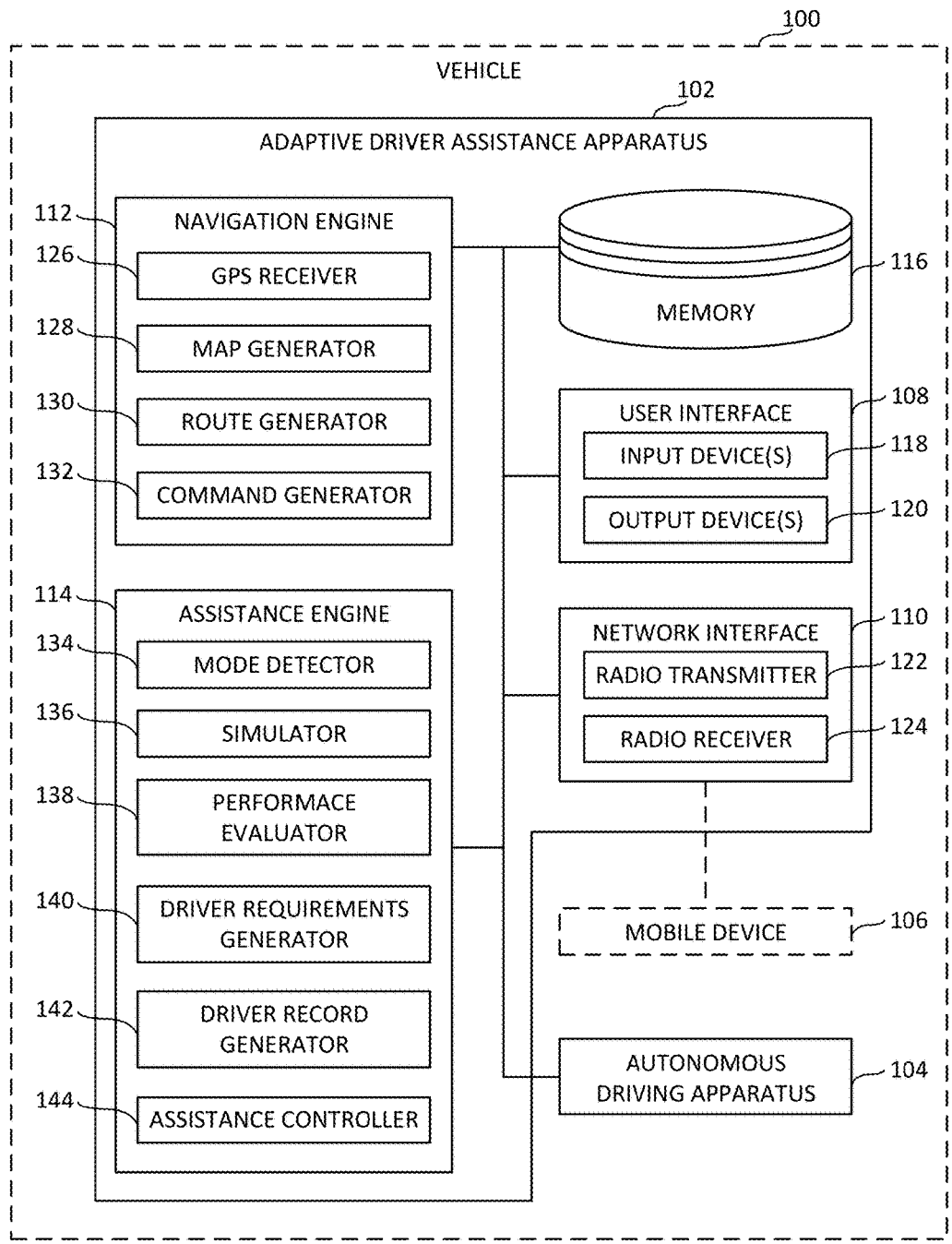
FIG. 1 is a block diagram of an example vehicle including an example adaptive driver assistance apparatus constructed in accordance with the teachings of this disclosure.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

DETAILED DESCRIPTION

Developmental disabilities and cognitive impairments include numerous disorders, syndromes and diseases that present wide-ranging levels and/or extents of impairment, even within an afflicted population of a specific one of the disorders, syndromes or diseases. For example, ASD is not a homogeneous disorder. Some individuals with ASD may express functional difficulties (e.g., easy distraction, physical clumsiness, poor organizational skills, etc.) that differ, either by way of extent or by way of type, from functional difficulties expressed by other individuals with ASD. Despite expressing such functional difficulties, many individuals with ASD can learn to master and even excel at tasks such as video games with practice.

Mastering the safe operation of and the sequencing necessary to drive a vehicle is certainly possible for individuals having developmental disabilities or cognitive impairments. The wide-ranging levels and/or extents of impairment that such individuals may exhibit, however, present a need for adaptive driver assistance that is personalized and/or tailored relative to the specific functional difficulties of each developmentally disabled or cognitively impaired individual.

A developmentally disabled driver may require navigation commands to be presented in a repetitive manner, or for multi-step functions to be broken down and prioritized. For example, while a typical driver (e.g., a driver not having a developmental disability) may be able to process and understand a navigation command presented on a single occasion at a specific distance away from a targeted driving maneuver (e.g., an instruction to turn presented to the driver when the vehicle is fifty meters away from a targeted location at which the turn is to occur), it may be necessary for the same navigation command to be repeated several times at various distances away from the targeted driving maneuver (e.g., instructions to turn presented to the driver when the vehicle is one-hundred meters, seventy-five meters, fifty meters, and twenty-five meters away from a targeted location at which the turn is to occur) in order for the driver with ASD to process and understand the command in a manner that allows the driver to make an appropriate driving response relative to the targeted driving maneuver.

As another example, while a typical driver may inherently know to put on a turn signal and to slow down the vehicle in response to a navigation command instructing the driver to make a left turn at an upcoming stop sign, it may be necessary for the same navigation command to be broken down into distinct commands in order for the driver with ASD to process and understand the command in a manner that allows the driver to make an appropriate driving response relative to the instructed driving maneuver. For example, it may be necessary for the driver with ASD to be presented with the following sequence of commands:

(1) You are approaching a stop sign.
(2) Put on your left turn signal and begin to slow down.
(3) Come to a complete stop at the stop sign and look for traffic.
(4) Proceed turning left if there is no traffic.

Conventional vehicle navigation systems typically provide standard and/or default routes as well as standard and/or default commands to guide a driver of a vehicle from a current location to a destination location. Individuals having developmental disabilities or cognitive impairments may experience difficulty in comprehending, following, adhering to, and/or otherwise appropriately responding to the standard and/or default routes and commands of conventional vehicle navigation systems, none of which are personalized and/or tailored to the specific functional difficulties of the developmentally disabled or cognitively impaired individual.

Unlike the above-described conventional vehicle navigation systems, the methods and apparatus disclosed herein advantageously provide adaptive assistance for developmentally disabled or cognitively impaired drivers. The adaptive driving assistance provided by the disclosed methods and apparatus is personalized and/or tailored to the specific functional difficulties of the developmentally disabled or cognitively impaired driver. The disclosed methods and apparatus accordingly enhance and/or expand the abilities of individuals having a developmental disability or a cognitive impairment to safely operate and/or drive a vehicle. Such enhanced and/or expanded driving abilities may advantageously provide individuals having a developmental disability or a cognitive disorder with greater independence in their daily lives, and may also potentially increase their chances of working jobs and raising families.

In some examples, the disclosed methods and apparatus present adapted navigation data (e.g., an adapted route, adapted commands, etc.) to a developmentally disabled or cognitively impaired driver based on driver assistance data that is personalized and/or tailored to the specific functional difficulties of the driver. The disclosed methods and apparatus present the adapted navigation data to assist the developmentally disabled or cognitively impaired driver in guiding a vehicle from a current location to a destination location. In such examples, the adapted navigation data is adapted based on the driver assistance data relative to normal, standard and/or default navigation data (e.g., a normal and/or default route, normal and/or default commands, etc.) that would otherwise be presented via the disclosed methods and apparatus to a typical driver (e.g., a driver not having a developmental disability or a cognitive impairment) to assist the typical driver in guiding the vehicle from the current location to the destination location. In some examples, the disclosed methods and apparatus may optimize the driver assistance data to enable the developmentally disabled or cognitively impaired driver to provide an appropriate response to (e.g., to comply with and/or adhere to) an adapted route and/or adapted commands presented to the developmentally disabled or cognitively impaired driver in association with the adapted navigation data.

FIG. 1 is a block diagram of an example vehicle 100 including an example adaptive driver assistance apparatus 102 constructed in accordance with the teachings of this disclosure. The vehicle 100 of FIG. 1 further includes an example autonomous driving apparatus 104. An example mobile device 106 associated with a driver of the vehicle 100 of FIG. 1 may also optionally be present within the vehicle 100. The adaptive driver assistance apparatus 102 of FIG. 1 is operatively coupled to (e.g., in electrical communication with) the autonomous driving apparatus 104 of FIG. 1, and may also be operatively coupled to the mobile device 106 of FIG. 1.

The adaptive driver assistance apparatus 102 of FIG. 1 provides adaptive assistance to developmentally disabled or cognitively impaired drivers (e.g., a driver of the vehicle 100 of FIG. 1). In the illustrated example of FIG. 1, the adaptive driver assistance apparatus 102 includes an example user interface 108, an example network interface 110, an example navigation engine 112, an example assistance engine 114, and an example memory 116. Respective ones of the user interface 108, the network interface 110, the navigation engine 112, the assistance engine 114, and the memory 116 of the adaptive driver assistance apparatus 102 of FIG. 1 are operatively coupled to one another via a network such as a controller area network ("CAN").

The autonomous driving apparatus 104 of FIG. 1 performs one or more automated driving maneuver(s) for the vehicle 100 of FIG. 1 without involvement from a driver of the vehicle 100. For example, the autonomous driving apparatus 104 may cause the vehicle 100 to brake, change lanes, turn, pull to the side of a roadway, stop, and/or park in an automated manner independent of any steering, braking, and/or acceleration input(s) that may be received from the driver of the vehicle 100. In the illustrated example of FIG. 1, the autonomous driving apparatus 104 is operatively coupled (e.g., via a network such as a CAN) to the adaptive driver assistance apparatus 102 of FIG. 1. As further described below, the autonomous driving apparatus 104 may perform one or more automated driving maneuver(s) for the vehicle 100 in response to one or more control signal(s) received from the adaptive driver assistance apparatus 102 of FIG. 1.

The mobile device 106 of FIG. 1 is associated with a driver of the vehicle 100 of FIG. 1. For example, the mobile device 106 may be implemented as a smartphone, a smartwatch, a tablet, etc. that is registered to and/or otherwise used by a driver of the vehicle 100. In some examples, the mobile device 106 may include driver identification data (e.g., a name of a driver, a driver's license number associated with the driver, etc.) that identifies the driver. In some examples, the driver identification data may identify one or more developmental disabilities and/or cognitive impairments associated with the driver. In the illustrated example of FIG. 1, the mobile device 106 is operatively coupled to the network interface 110 of the adaptive driver assistance apparatus 102 such that driver identification data and/or a driver record associated with the driver of the vehicle 100 may be communicated from the mobile device 106 to the adaptive driver assistance apparatus 102 and vice-versa.

In some examples, one or more of the user interface 108, the network interface 110, the navigation engine 112, the assistance engine 114, the memory 116, and/or, more generally, the adaptive driver assistance apparatus 102 of FIG. 1 may be incorporated into the mobile device 106 of FIG. 1. In some such examples, one or more of the user interface 108, the network interface 110, the navigation engine 112, the assistance engine 114, the memory 116, and/or, more generally, the adaptive driver assistance apparatus 102 of FIG. 1 may be implemented via hardware of the mobile device 106 and/or via an application executing on the mobile device 106 of FIG. 1.

The user interface 108 of FIG. 1 facilitates interactions and/or communications between an end user (e.g., a driver of the vehicle 100 of FIG. 1) and the adaptive driver assistance apparatus 102 of FIG. 1. The user interface 108 includes one or more example input device(s) 118 via which the user may actively and/or passively input data and/or information to the adaptive driver assistance apparatus 102. For example, the input device(s) 118 may be implemented as a button, a switch, a touchscreen, a microphone, an audio sensor, a voice recognition system, a camera (e.g., a driver camera that captures the driver's gaze and/or facial expressions, a rear view camera that captures an approaching emergency vehicle, etc.), and/or a physiological sensor (e.g., a heart rate sensor, a blood pressure sensor, a pulse oximeter, etc.) that enable(s) the user to convey data and/or commands to the adaptive driver assistance apparatus 102.

In some examples, the input device(s) 118 of the user interface 108 of FIG. 1 enable a driver of the vehicle to actively (e.g., voluntarily) identify a developmental disability and/or a cognitive impairment of the driver. In other examples, the input device(s) 118 of the user interface 108 may detect, measure and/or sense a facial expression and/or a physiological response produced by the driver, and such input data may be utilized by the adaptive driver assistance apparatus 102 of FIG. 1 in the course of identifying a developmental disability and/or a cognitive impairment of the driver, identifying the extent of driving assistance needed by the driver, and/or identifying a need for invoking the autonomous driving apparatus 104 of the vehicle 100 of FIG. 1.

The user interface 108 of FIG. 1 also includes one or more example output device(s) 120 via which the adaptive driver assistance apparatus 102 of FIG. 1 presents data and/or information in graphical, textual and/or audible form to the user. For example, the output device(s) 120 of FIG. 1 may be implemented as a touchscreen and/or a liquid crystal display for presenting graphical and/or textual information, and/or as a speaker for presenting audible information. Data and/or information that is presented and/or received via the user interface 108 of FIG. 1 (e.g., via the input device(s) 118 and/or the output device(s) 120) may be of any type, form and/or format, and may be stored in a computer-readable storage medium such as the memory 116 of FIG. 1 described below.

The network interface 110 of FIG. 1 facilitates communications between the adaptive driver assistance apparatus 102 of FIG. 1 and one or more external machine(s) (e.g., the mobile device 106 of FIG. 1, other vehicles, etc.). The network interface 110 includes an example radio transmitter 122 via which data and/or information may be transmitted from the adaptive driver assistance apparatus 102 of FIG. 1 to an external machine via a network (e.g., a wireless network, a cellular network, etc.). For example, the radio transmitter 122 of the network interface 110 may transmit data and/or information to the mobile device 106 of FIG. 1 corresponding to a driver record associated with the driver of the vehicle 100 of FIG. 1, who may also be the registered user of the mobile device 106 of FIG. 1. The network interface 110 also includes an example radio receiver 124 via which data and/or information may be received by and/or at the adaptive driver assistance apparatus 102 of FIG. 1 from an external machine via a network (e.g., a wireless network, a cellular network, etc.). For example, the radio receiver 124 of the network interface 110 may receive data and/or information from the mobile device 106 of FIG. 1 corresponding to driver identification data and/or a driver record. Data and/or information that is transmitted and/or received via the network interface 110 of FIG. 1 may be of any type, form and/or format, and may be stored in a computer-readable storage medium such as the memory 116 of FIG. 1 described below.

The navigation engine 112 of FIG. 1 generates, manages and/or controls navigation data (e.g., maps, routes, commands, etc.) to be presented via the user interface 108 of FIG. 1. In some examples, the navigation data generated, managed and/or controlled by the navigation engine 112 is adapted based on driver assistance data (e.g., driver-specific route requirements, driver-specific command requirements, etc.) generated and/or provided by the assistance engine 114 of FIG. 1 to assist a driver having a developmental disability and/or a cognitive impairment (e.g., a driver of the vehicle 100 of FIG. 1), as further described below. In the illustrated example of FIG. 1, the navigation engine includes an example GPS receiver 126, an example map generator 128, an example route generator 130, and an example command generator 132.

The GPS receiver 126 of FIG. 1 collects, acquires and/or receives data and/or one or more signal(s) from one or more GPS satellite(s) (not shown). The data and/or signal(s) received by the GPS receiver 126 may include information from which the current location of the adaptive driver assistance apparatus 102 of FIG. 1 and/or, more generally, the vehicle 100 of FIG. 1 may be identified and/or derived, including for example, the current latitude and longitude of the adaptive driver assistance apparatus 102 and/or the vehicle 100. Location data identified and/or derived from the signal(s) collected and/or received by the GPS receiver 126 of FIG. 1 may be associated with one or more time(s) (e.g., time stamped) at which the data and/or signal(s) were collected and/or received by the GPS receiver 126. Location data identified and/or derived from the signal(s) collected and/or received by the GPS receiver 126 of FIG. 1 may be of any type, form and/or format, and may be stored in a computer-readable storage medium such as the memory 116 of FIG. 1 described below.

The map generator 128 of FIG. 1 generates a map (e.g., map data) to be presented graphically at the user interface 108 of FIG. 1. In some examples, the map generated by the map generator 128 is based on the location data identified and/or derived from the signal(s) collected and/or received by the GPS receiver 126 of FIG. 1. The map generated by the map generator 128 may include a graphical representation and/or indication of the location data, and may further incorporate, include, and/or be based on known area map data stored in a computer-readable storage medium such as the memory 116 of FIG. 1 described below. In some examples, the map generated by the map generator 128 corresponds to and/or represents one or more geographic area(s) that are common and/or overlapping with respect to the location data. In some examples, the map generated by the map generator 128 is a simulated test map that may have no relation to the location data. Maps and/or map data generated by the map generator 128 of FIG. 1 may be of any type, form and/or format, and may be stored in a computer-readable storage medium such as the memory 116 of FIG. 1 described below.

The route generator 130 of FIG. 1 generates a route (e.g., route data) to be presented graphically at the user interface 108 of FIG. 1. In some examples, the route generated by the route generator 130 is to be followed by the vehicle 100 of FIG. 1 (e.g., via a driver controlling the vehicle 100) as the vehicle 100 travels from a current location to a destination location associated with the route. In some examples, the route generated by the route generator 130 of FIG. 1 is based on and/or associated with the map generated by the map generator 128 of FIG. 1. For example, the route generator 130 may generate a route to be presented relative to a map generated by the map generator 128 such that the route is overlaid, superimposed, and/or otherwise incorporated into and/or onto the map when the map is presented at the user interface 108 of FIG. 1. In some examples, the route generated by the route generator 130 of FIG. 1 is based on and/or associated with the location data identified and/or derived from the signal(s) collected and/or received by the GPS receiver 126 of FIG. 1. For example, a route generated by the route generator 130 may be based on a current location of the adaptive driver assistance apparatus 102 identified and/or derived from the signal(s) collected and/or received by the GPS receiver 126 of FIG. 1, and further based on a destination location (e.g., destination data) identified and/or received via the user interface 108 of FIG. 1.

In some examples, the route generator 130 of FIG. 1 generates a normal route (e.g., a default and/or standard route) to be followed by the driver of the vehicle 100 of FIG. 1 as the vehicle 100 travels from a current location to a destination location. The route generator 130 may generate the normal route when the adaptive driver assistance apparatus 102 of FIG. 1 is operating in a normal mode. In other examples, the route generator 130 of FIG. 1 generates a test route (e.g., a route used for the purpose of evaluating the performance of the driver) to be followed by the driver of the vehicle 100 of FIG. 1 as the driver performs simulated driving maneuvers while the vehicle 100 is stationary. The route generator 130 may generate the test route when the adaptive driver assistance apparatus 102 of FIG. 1 is operating in an assistive learning mode, as further described below. In still other examples, the route generator 130 of FIG. 1 generates an adapted route (e.g., a route adapted in relation to the normal route) to be followed by the driver of the vehicle 100 of FIG. 1 as the vehicle 100 travels from a current location to a destination location. The adapted route may be adapted relative to the normal route based on driver assistance data (e.g., driver-specific route requirements) generated and/or provided by the assistance engine 114 of FIG. 1 to assist a driver having a developmental disability and/or a cognitive impairment. The route generator 130 may generate the adapted route when the adaptive driver assistance apparatus 102 of FIG. 1 is operating in an assistive driving mode, as further described below. Routes and/or route data (e.g., normal routes, test routes, adapted routes, etc.) generated by the route generator 130 of FIG. 1 may be of any type, form and/or format, and may be stored in a computer-readable storage medium such as the memory 116 of FIG. 1 described below.

The command generator 132 of FIG. 1 generates one or more command(s) (e.g., command data) to be presented audibly, graphically, and/or textually at the user interface 108 of FIG. 1. In some examples, the command(s) generated by the command generator 132 is/are to be followed and/or adhered to by the vehicle 100 of FIG. 1 (e.g., via a driver controlling the vehicle 100) as the vehicle 100 travels from a current location to a destination location associated with a route. In some examples, the command(s) generated by the command generator 132 of FIG. 1 is/are based on and/or associated with the route generated by the route generator 130 of FIG. 1. For example, the command generator 132 may generate one or more command(s) to be presented relative to a route generated by the route generator 130 such that the command(s) is/are presented at the user interface 108 of FIG. 1 at one or more particular location(s) and/or time(s) associated with the route when the route is presented at the user interface 108 of FIG. 1. In some examples, the command(s) generated by the command generator 132 of FIG. 1 is/are based on and/or associated with the location data identified and/or derived from the signal(s) collected and/or received by the GPS receiver 126 of FIG. 1. For example, a command generated by the command generator 132 may be based on a current location of the adaptive driver assistance apparatus 102 identified and/or derived from the signal(s) collected and/or received by the GPS receiver 126 of FIG. 1, and further based on a destination location identified via the user interface 108 of FIG. 1.

In some examples, the command generator 132 of FIG. 1 generates normal commands (e.g., default commands and/or standard commands) to be followed by the driver of the vehicle 100 of FIG. 1 as the vehicle 100 travels along the route generated by the route generator 130 of FIG. 1. The command generator 132 may generate the normal commands when the adaptive driver assistance apparatus 102 of FIG. 1 is operating in a normal mode. In other examples, the command generator 132 of FIG. 1 generates test commands (e.g., commands used for the purpose of evaluating the performance of the driver) to be followed by the driver of the vehicle 100 of FIG. 1 as the driver performs simulated driving maneuvers while the vehicle 100 is stationary. The command generator 132 may generate the test commands when the adaptive driver assistance apparatus 102 of FIG. 1 is operating in an assistive learning mode, as further described below. In still other examples, the command generator 132 of FIG. 1 generates adapted commands (e.g., commands adapted in relation to the normal commands) to be followed by the driver of the vehicle 100 of FIG. 1 as the vehicle 100 travels along the route generated by the route generator 130 of FIG. 1. The adapted commands may be adapted relative to the normal commands based on driver assistance data (e.g., driver-specific command requirements) generated and/or provided by the assistance engine 114 of FIG. 1 to assist a driver having a developmental disability and/or a cognitive impairment. The command generator 132 may generate the adapted commands when the adaptive driver assistance apparatus 102 of FIG. 1 is operating in an assistive driving mode, as further described below. Commands and/or command data (e.g., normal commands, test commands, adapted commands, etc.) generated by the command generator 132 of FIG. 1 may be of any type, form and/or format, and may be stored in a computer-readable storage medium such as the memory 116 of FIG. 1 described below.

In some examples, the navigation engine 112 of FIG. 1 may collect and/or acquire traffic data (e.g., data indicative of a level and/or extent of traffic congestion arising from vehicles (e.g., vehicle other than the vehicle 100 of FIG. 1) traveling through a geographic area). In some such examples, the traffic data may be associated with a route generated by the route generator 130 of FIG. 1. For example, the navigation engine 112 of FIG. 1 may collect and/or acquire the traffic data prior to the route generator 130 of FIG. 1 generating a route for the vehicle 100 of FIG. 1. In some such examples, the navigation engine 112 may instruct and/or otherwise cause the route generator 130 to generate a route for the vehicle 100 that avoids levels and/or extents of traffic congestion associated with the traffic data that exceed a traffic congestion threshold. As another example, the navigation engine 112 of FIG. 1 may additionally or alternatively collect and/or acquire the traffic data while the vehicle 100 of FIG. 1 is traveling along an initial route generated by the route generator 130 of FIG. 1. In some such examples, the navigation engine 112 may instruct and/or otherwise cause the route generator 130 to generate an alternate route (e.g., alternate relative to the initial route) in response to detecting that levels and/or extents of traffic congestion associated with the traffic data along the initial route exceed a traffic congestion threshold. In such examples, the alternate route redirects the vehicle 100 to avoid heightened and/or extreme levels and/or extents of traffic congestion. The ability of the navigation engine 112 of FIG. 1 to redirect and/or reroute the vehicle 100 of FIG. 1 based on traffic congestion considerations may be beneficial to any driver of the vehicle 100, and may be particularly beneficial to assist a driver of the vehicle 100 having a developmental disability and/or a cognitive impairment.

The assistance engine 114 of FIG. 1 evaluates the driving capabilities of a driver of the vehicle 100 of FIG. 1 and, based on such an evaluation, generates, manages and/or controls driver assistance data (e.g., driver-specific route requirements, driver-specific command requirement, etc.) to be provided to the navigation engine 112 of FIG. 1. Driver assistance data generated by the assistance engine 114 causes the navigation engine 112 to adapt the navigation data to be generated, managed and/or controlled by the navigation engine 112 to assist a driver having a developmental disability and/or a cognitive impairment (e.g., a driver of the vehicle 100 of FIG. 1). In the illustrated example of FIG. 1, the assistance engine 114 includes an example mode detector 134, an example simulator 136, an example performance evaluator 138, an example driver requirements generator 140, an example driver record generator 142, and an example assistance controller 144.

The mode detector 134 of FIG. 1 detects, identifies and/or determines an operational mode of the adaptive driver assistance apparatus 102 of FIG. 1. In some examples, the mode detector 134 detects, identifies and/or determines the operational mode of the adaptive driver assistance apparatus 102 based on one or more mode selection input(s) (e.g., mode selection data) identified and/or received via the user interface 108 of FIG. 1. In some examples, the mode detector 134 of FIG. 1 detects, identifies and/or determines that the operational mode of the adaptive driver assistance apparatus 102 is one of a normal mode, an assistive learning mode, or an assistive driving mode. The normal mode may be indicative of an operational mode in which navigation data generated, controlled and/or managed via the navigation engine 112 of FIG. 1 (e.g., normal, standard and/or default navigation data) need not be adapted to assist a driver of the vehicle 100 (e.g., instances in which the driver of the vehicle 100 is not a developmentally disabled and/or cognitively impaired driver). The assistive learning mode may be indicative of an operational mode in which the assistance engine 114 is to evaluate a driving performance (e.g., a simulated driving performance based on a test route and/or test commands generated by the navigation engine 112 of FIG. 1) of a driver of the vehicle 100 to determine whether the driver is developmentally disabled and/or cognitively impaired, and/or to determine the extent and/or content of driver assistance data that may thereafter be utilized to adapt the navigation data generated, controlled and/or managed via the navigation engine 112 of FIG. 1. The assistive driving mode may be indicative of an operational mode in which the assistance engine 114 provides driver assistance data that adapts navigation data generated, controlled and/or managed via the navigation engine 112 of FIG. 1 to assist a developmentally disabled and/or cognitively impaired driver. Mode selection data detected, identified and/or determined by the mode detector 134 of FIG. 1 may be of any type, form and/or format, and may be stored in a computer-readable storage medium such as the memory 116 of FIG. 1 described below.

The simulator 136 of FIG. 1 manages and/or controls a simulated driving experience to be presented to the driver of the vehicle 100 of FIG. 1 via the user interface 108 of FIG. 1 while the vehicle 100 is stationary (e.g., while the vehicle 100 is running and parked). The simulator 136 enables a driver of the vehicle 100 of FIG. 1 to perform and/or mimic one or more driving maneuvers (e.g., turning, braking, accelerating, etc.) in response to a test route and/or test commands that simulate an actual driving experience that the driver may encounter while driving the vehicle 100. In some examples, the simulator 136 may be initiated and/or invoked in response to the mode detector 134 of FIG. 1 detecting, identifying and/or determining that the operational mode of the adaptive driver assistance apparatus 102 is an assistive learning mode.

In some examples, the simulator 136 of FIG. 1 instructs or otherwise causes the map generator 128 of FIG. 1 to generate a test map associated with the simulated driving experience. In some examples, the simulator 136 instructs or otherwise causes the route generator 130 of FIG. 1 to generate a test route associated with the simulated driving experience (e.g., a test route based on the test map). In some examples, the simulator 136 instructs or otherwise causes the command generator 132 of FIG. 1 to generate test commands associated with the simulated driving experience (e.g., test commands based on the test route). The generated test map, test route and test commands may be presented to a driver of the vehicle 100 via the user interface 108 of FIG. 1 in connection with the simulated driving experience. While the simulated driving experience is being presented to the driver of the vehicle 100 of FIG. 1 via the user interface 108 of FIG. 1, the simulator 136 of FIG. 1 collects and/or receives one or more signal(s) from the vehicle 100 (e.g., via a network such as a CAN) from which maneuver data indicative of the performance of various driving maneuvers (e.g., turning, braking, accelerating, etc.) by the driver may be identified and/or derived. Maneuver data identified and/or derived from the signal(s) collected and/or received by the simulator 136 of FIG. 1 may be of any type, form and/or format, and may be stored in a computer-readable storage medium such as the memory 116 of FIG. 1 described below.

The performance evaluator 138 of FIG. 1 tracks maneuvers (e.g., steering wheel movements, brake pedal movements, accelerator pedal movements, etc.) of the vehicle 100 of FIG. 1 and/or movement of the vehicle 100 of FIG. 1 relative to target maneuvers (e.g., expected maneuvers) and/or target movements (e.g., expected movements) associated with the route generated by the route generator 130 of FIG. 1 and/or the command(s) generated by the command generator 132 of FIG. 1. For example, the performance evaluator 138 may track maneuvers of the vehicle 100 relative to target maneuvers associated with a test route generated by the route generator 130 and/or test command(s) generated by the command generator 132. As described above, the test route and test commands may be presented via the user interface 108 of FIG. 1 while the vehicle 100 is stationary (e.g., while the vehicle 100 is running and parked) based on a simulated driving experience managed and/or controlled by the simulator 136 of FIG. 1. In some examples, the performance evaluator 138 may be initiated and/or invoked in response to the mode detector 134 of FIG. 1 detecting, identifying and/or determining that the operational mode of the adaptive driver assistance apparatus 102 is an assistive learning mode.

In some examples, the performance evaluator 138 of FIG. 1 generates performance data indicative of instances in which the maneuvers of the vehicle 100 of FIG. 1 deviate, depart, and/or stray from target maneuvers associated with the test route generated by the route generator 130 of FIG. 1 and/or the test command(s) generated by the command generator 132 of FIG. 1. For example, the performance evaluator 138 may compare maneuver data identified and/or derived from the signal(s) collected and/or received by the simulator 136 of FIG. 1 to the test route generated by the route generator 130 and/or the test command(s) generated by the command generator 132 to determine whether the vehicle 100 failed to make a simulated turn specified by the test route and/or the test command(s). As another example, the performance evaluator 138 may compare maneuver data identified and/or derived from the signal(s) collected and/or received by the simulator 136 of FIG. 1 to the test route generated by the route generator 130 and/or the test command(s) generated by the command generator 132 to determine whether the vehicle 100 failed to make a simulated complete stop specified by the test route and/or the test command(s).

The performance evaluator 138 of FIG. 1 may alternatively operate while the vehicle 100 of FIG. 1 is moving (e.g., when the vehicle 100 is not stationary). For example, the performance evaluator 138 may be initiated and/or invoked in response to the mode detector 134 of FIG. 1 detecting, identifying and/or determining that the operational mode of the adaptive driver assistance apparatus 102 is an assistive driving mode. In such examples, the performance evaluator 138 of FIG. 1 generates performance data indicative of instances in which movements of the vehicle 100 of FIG. 1 deviate, depart, and/or stray from target movements associated with the route generated by the route generator 130 of FIG. 1 and/or the command(s) generated by the command generator 132 of FIG. 1. For example, the performance evaluator 138 may compare location data identified and/or derived from the signal(s) collected and/or received by the GPS receiver 126 of FIG. 1 to the route generated by the route generator 130 and/or the command(s) generated by the command generator 132 to determine whether the vehicle 100 failed to make a turn specified by the route and/or the command(s). As another example, the performance evaluator 138 may compare location data identified and/or derived from the signal(s) collected and/or received by the GPS receiver 126 of FIG. 1 to the route generated by the route generator 130 and/or the command(s) generated by the command generator 132 to determine whether the vehicle 100 failed to make a complete stop specified by the route and/or the command(s). Performance data generated by the performance evaluator 138 of FIG. 1 may be of any type, form and/or format, and may be stored in a computer-readable storage medium such as the memory 116 of FIG. 1 described below.

The driver requirements generator 140 of FIG. 1 generates driver assistance data (e.g., driver-specific route requirements, driver-specific command requirements, etc.) based on the performance data generated by the performance evaluator 138 of FIG. 1. The driver assistance data generated by the driver requirements generator 140 is to adapt the navigation data to be generated, managed and/or controlled by the navigation engine 112 of FIG. 1 to assist a driver having a developmental disability and/or a cognitive impairment (e.g., a driver of the vehicle 100 of FIG. 1) as indicated by the performance data. In some examples, the driver requirements generator 140 generates driver assistance data including one or more driver-specific route requirement(s) and/or one or more driver-specific command requirement(s) that are optimized in terms of the sequence, the frequency, and/or the timing associated with routes and/or commands to be provided to the driver of the vehicle 100 of FIG. 1 as the driver performs one or more driving maneuvers (e.g., turning, changing lanes, braking, accelerating, etc.).

For example, if the performance data indicates that the driver of the vehicle 100 of FIG. 1 fails to adhere to a command presented on only a single occasion prior to a driving maneuver (e.g., a turn, a stop, etc.), the driver requirements generator 140 of FIG. 1 may generate a command requirement indicating that commands presented to the driver must be presented on at least two occasions prior to the driving maneuver. As another example, if the performance data indicates that the driver of the vehicle 100 of FIG. 1 fails to adhere to a command presented less than five seconds prior to a driving maneuver, the driver requirements generator 140 of FIG. 1 may generate a command requirement indicating that commands presented to the driver must be presented at least ten seconds prior to the driving maneuver.

As another example, if the performance data indicates that the driver of the vehicle 100 of FIG. 1 fails to adhere to a route having two consecutive turns occurring less than five seconds and/or less than fifty meters apart from one another, the driver requirements generator 140 of FIG. 1 may generate a route requirement indicating that the route presented to the driver must not include two consecutive turns that are less than ten seconds apart from one another or less than one hundred meters apart from one another. As another example, if the performance data indicates that the driver of the vehicle 100 of FIG. 1 fails to adhere to commands presented to the driver when the vehicle 100 of FIG. 1 is on a highway, the driver requirements generator 140 of FIG. 1 may generate a route requirement indicating that the route presented to the driver must be restricted to non-highway roads.

As yet another example, if the performance data indicates that the driver of the vehicle 100 of FIG. 1 is not receptive to audible commands (e.g., that the performance of the driver decreases and/or worsens when an audible command is presented), the driver requirements generator 140 of FIG. 1 may generate a command requirement indicating that commands to be presented to the driver must include visual and/or textual commands only.

The driver requirements generator 140 of FIG. 1 may optimize the route requirement(s) and/or the command requirement(s) of the driver assistance data to enable the driver to provide an appropriate response to (e.g., to comply with and/or adhere to) a route and/or commands presented to the driver via the user interface 108 of FIG. 1 as the vehicle 100 of FIG. 1 travels from its current location to a destination location. For example, the driver requirements generator 140 may determine that each command to be presented to the driver is to be presented on two separate occasions prior to an associated driving maneuver, that the two occasions are to be spaced apart by ten seconds, and that the final occasion occurs approximately least ten seconds prior to the associated driving maneuver. Driver assistance data generated by the driver requirements generator 140 of FIG. 1 may be of any type, form and/or format, and may be stored in a computer-readable storage medium such as the memory 116 of FIG. 1 described below.

The driver record generator 142 of FIG. 1 generates a driver record for a driver of the vehicle 100 of FIG. 1. In some examples, the driver record generated by the driver record generator 142 includes the driver assistance data generated for the driver by the driver requirements generator 140 of FIG. 1. In some examples, the driver record generated by the driver record generator 142 additionally includes driver identification data received via the user interface 108 of FIG. 1, or received from the mobile device 106 of FIG. 1 via the network interface 110 of FIG. 1. In such examples, the driver record generated by the driver record generator 142 of FIG. 1 may associate the driver identification data with the driver assistance data such that the driver assistance data, and/or, more generally, the driver record, is linked to and/or otherwise corresponds to a specific driver of the vehicle 100 of FIG. 1. The driver record generator 142 of FIG. 1 may accordingly generate different driver records corresponding to different drivers of the vehicle 100 of FIG. 1 and including the corresponding driver assistance data for respective ones of the different drivers. Driver records generated by the driver record generator 142 of FIG. 1 may be of any type, form and/or format, and may be stored in a computer-readable storage medium such as the memory 116 of FIG. 1 described below.

The assistance controller 144 of FIG. 1 generates one or more control signal(s) that instruct and/or otherwise cause the route generator 130 of FIG. 1 and/or the command generator 132 of FIG. 1 to respectively generate an adapted route (e.g., adapted relative to a normal and/or default route that would otherwise be generated) and/or adapted commands (e.g., adapted relative to normal and/or default commands that would otherwise be generated) to assist a developmentally disabled and/or cognitively impaired driver of the vehicle 100 of FIG. 1. In some examples, the control signal(s) generated by the assistance controller 144 of FIG. 1 are based on the driver assistance data generated by the driver requirements generator 140 of FIG. 1, and/or based on the driver record generated by the driver record generator 142 of FIG. 1.

In some examples, the assistance controller 144 of FIG. 1 generates one or more control signal(s) that instruct and/or otherwise cause the autonomous driving apparatus 104 of FIG. 1 to perform one or more automated driving maneuver(s) for the vehicle 100 of FIG. 1. For example, the assistance controller 144 may generate one or more control signal(s) that instruct and/or otherwise cause the autonomous driving apparatus 104 to slow down the vehicle 100, to cause the vehicle 100 to change lanes, to pull the vehicle 100 over to the side of a roadway, and/or to park the vehicle 100. In some such examples, the assistance controller 144 of FIG. 1 generates the control signal(s) to initiate and/or invoke the autonomous driving apparatus 104 of FIG. 1 in response to detecting and/or determining that the driver of the vehicle 100 of FIG. 1 is in, and/or is likely to be in, a state of distress.

For example, the assistance controller 144 of FIG. 1 may generate control signal(s) to initiate and/or invoke the autonomous driving apparatus 104 of FIG. 1 in response to determining that one or more facial expression(s) and/or physiological response(s) of the driver acquired and/or received via the input device(s) 118 of the user interface 108 of FIG. 1 is/are indicative of significant anxiety and/or distress of the driver, and/or indicative of a need for automated driving assistance. As another example, the assistance controller 144 of FIG. 1 may generate control signal(s) to initiate and/or invoke the autonomous driving apparatus 104 of FIG. 1 in response to determining that input data acquired and/or received via the input device(s) 118 of the user interface 108 of FIG. 1 is indicative of an emergency vehicle approaching (e.g., approaching from the rear) the vehicle 100 of FIG. 1. As yet another example, the assistance controller 144 of FIG. 1 may generate control signal(s) to initiate and/or invoke the autonomous driving apparatus 104 of FIG. 1 in response to determining that the performance data generated by the performance evaluator 138 of FIG. 1 demonstrates severe driving impairments (e.g., failure to make any turns, failure to adhere to any commands to slow down or stop the vehicle, etc.).

The memory 116 of FIG. 1 may be implemented by any type(s) and/or any number(s) of storage device(s) such as a storage drive, a flash memory, a read-only memory (ROM), a random-access memory (RAM), a cache and/or any other storage medium in which data and/or information is stored for any duration (e.g., for extended time periods, permanently, brief instances, for temporarily buffering, and/or for caching of the data and/or information). Data and/or information stored in the memory 116 of FIG. 1 may be stored in any file and/or data structure format, organization scheme, and/or arrangement.

Data and/or information corresponding to any of the above-described driver identification data, location data, destination data, navigation data, known area map data, map data, route data (e.g., normal route data, test route data, and/or adapted route data), command data (e.g., normal command data, test command data, and/or adapted command data), mode selection data, maneuver data, performance data, driver assistance data (e.g., route requirements and/or command requirements), and/or driver record may be stored in the memory 116 of FIG. 1. Data and/or information stored in the memory 116 of FIG. 1 is accessible to one or more of the user interface 108 (including the output device(s) 120), the network interface 110 (including the radio transmitter 122), the navigation engine 112 (including the map generator 128, the route generator 130, and the command generator 132), and/or the assistance engine 114 (including the mode detector 134, the simulator 136, the performance evaluator 138, the driver requirements generator 140, the driver record generator 142, and the assistance controller 144) of FIG. 1, and/or, more generally, to the adaptive driver assistance apparatus 102 of FIG. 1.

While an example manner of implementing the adaptive driver assistance apparatus 102 is illustrated in FIG. 1, one or more of the elements, processes and/or devices illustrated in FIG. 1 may be combined, divided, re-arranged, omitted, eliminated and/or implemented in any other way. Further, the example user interface 108, the example network interface 110, the example navigation engine 112, the example assistance engine 114, the example memory 116, the example input device(s) 118, the example output device(s) 120, the example radio transmitter 122, the example radio receiver 124, the example GPS receiver 126, the example map generator 128, the example route generator 130, the example command generator 132, the example mode detector 134, the example simulator 136, the example performance evaluator 138, the example driver requirements generator 140, the example driver record generator 142, the example assistance controller 144, and/or, more generally, the example adaptive driver assistance apparatus 102 of FIG. 1 may be implemented by hardware, software, firmware and/or any combination of hardware, software and/or firmware. Thus, for example, any of the example user interface 108, the example network interface 110, the example navigation engine 112, the example assistance engine 114, the example memory 116, the example input device(s) 118, the example output device(s) 120, the example radio transmitter 122, the example radio receiver 124, the example GPS receiver 126, the example map generator 128, the example route generator 130, the example command generator 132, the example mode detector 134, the example simulator 136, the example performance evaluator 138, the example driver requirements generator 140, the example driver record generator 142, the example assistance controller 144, and/or, more generally, the example adaptive driver assistance apparatus 102 of FIG. 1 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example user interface 108, the example network interface 110, the example navigation engine 112, the example assistance engine 114, the example memory 116, the example input device(s) 118, the example output device(s) 120, the example radio transmitter 122, the example radio receiver 124, the example GPS receiver 126, the example map generator 128, the example route generator 130, the example command generator 132, the example mode detector 134, the example simulator 136, the example performance evaluator 138, the example driver requirements generator 140, the example driver record generator 142, the example assistance controller 144, and/or, more generally, the example adaptive driver assistance apparatus 102 of FIG. 1 is/are hereby expressly defined to include a non-transitory computer readable storage device or storage disk such as a memory, a digital versatile disk (DVD), a compact disk (CD), a Blu-ray disk, etc. including the software and/or firmware. Further still, the example adaptive driver assistance apparatus 102 of FIG. 1 may include one or more elements, processes and/or devices in addition to, or instead of, those illustrated in FIG. 1, and/or may include more than one of any or all of the illustrated elements, processes and devices.

Flowcharts representative of example methods for implementing the example adaptive driver assistance apparatus 102 of FIG. 1 to adaptively assist a developmentally disabled and/or cognitively impaired driver are shown in FIGS. 2-5. In these example, the methods may be implemented using machine readable instructions that comprise one or more program(s) for execution by one or more processor(s) such as the processor 602 shown in the example processor platform 600 discussed below in connection with FIG. 6. The one or more program(s) may be embodied in software stored on a non-transitory computer readable storage medium such as a CD-ROM, a floppy disk, a hard drive, a digital versatile disk (DVD), a Blu-ray disk, or a memory associated with the processor 602, but the entirety of any program and/or parts thereof could alternatively be executed by a device other than the processor 602, and/or embodied in firmware or dedicated hardware. Further, although the example program(s) is/are described with reference to the flowcharts illustrated in FIGS. 2-5, many other methods of implementing the example adaptive driver assistance apparatus 102 of FIG. 1 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example methods of FIGS. 2-5 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which data and/or information is stored for any duration (e.g., for extended time periods, permanently, for brief instances, for temporarily buffering, and/or for caching of the data and/or information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

Figure 2:
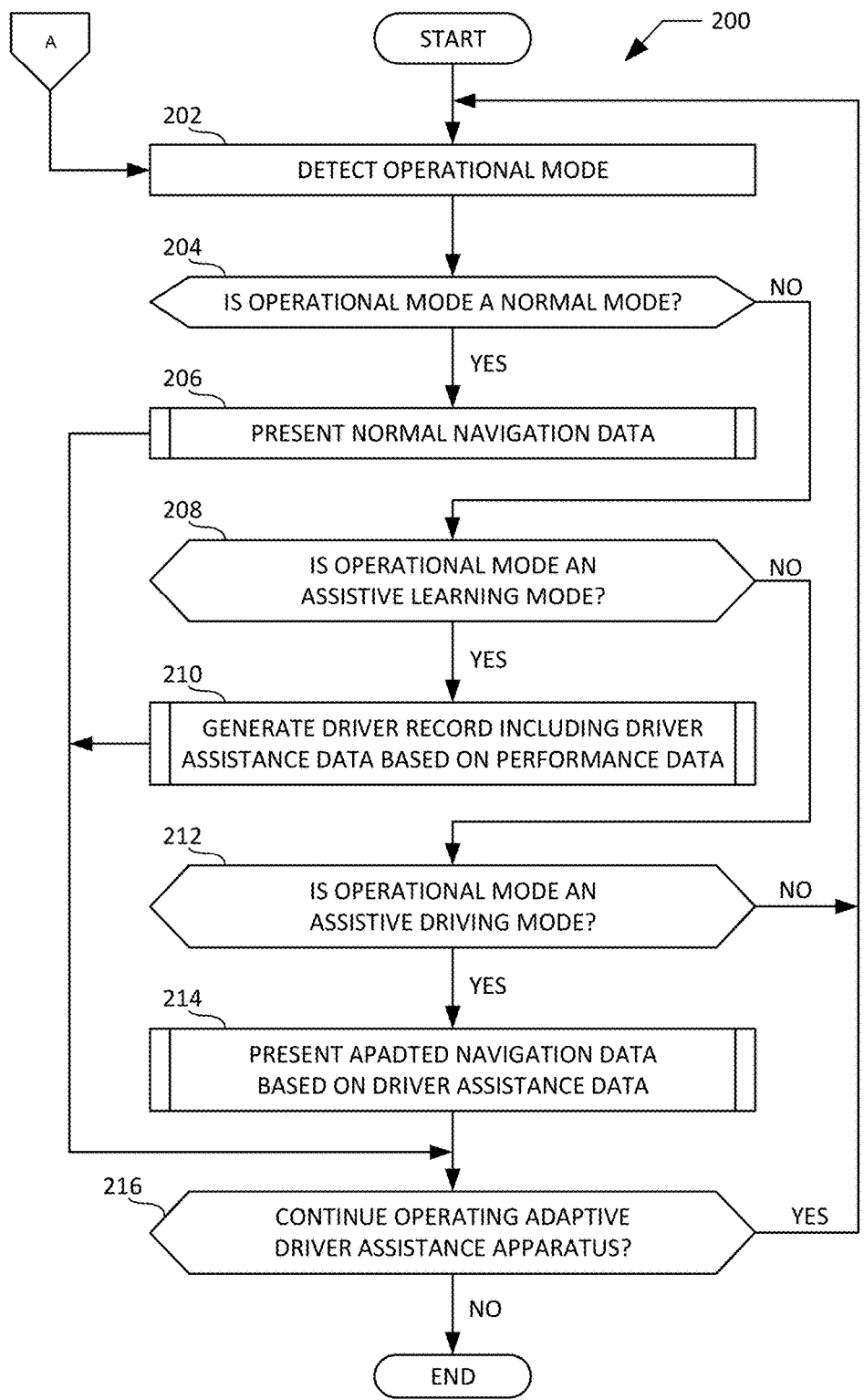
FIG. 2 is a flowchart representative of an example method that may be executed at the example adaptive driver assistance apparatus of FIG. 1 to adaptively assist a developmentally disabled or cognitively impaired driver of the vehicle of FIG. 1.

FIG. 2 is a flowchart representative of an example method 200 that may be executed at the example adaptive driver assistance apparatus 102 of FIG. 1 to adaptively assist a developmentally disabled or cognitively impaired driver of the vehicle 100 of FIG. 1. The method 200 of FIG. 2 begins when the mode detector 134 of FIG. 1 detects an operational mode of the adaptive driver assistance apparatus 102 of FIG. 1 (block 202). For example, the mode detector 134 may detect, identify and/or determine the operational mode of the adaptive driver assistance apparatus 102 based on one or more mode selection input(s) (e.g., mode selection data) identified and/or received via the user interface 108 of FIG. 1. In some examples, the mode detector 134 may detect, identify and/or determine that the operational mode of the adaptive driver assistance apparatus 102 is one of a normal mode, an assistive learning mode, or an assistive driving mode. Following block 202, the example method 200 of FIG. 2 proceeds to block 204.

At block 204, the mode detector 134 of FIG. 1 determines whether the detected operational mode is a normal mode (block 204). If the mode detector 134 determines at block 204 that the detected operational mode is a normal mode, control of the example method 200 of FIG. 2 proceeds to block 206. If the mode detector 134 instead determines at block 204 that the operational mode is not a normal mode, control of the example method 200 of FIG. 2 proceeds to block 208.

At block 206, the adaptive driver assistance apparatus 102 of FIG. 1 presents normal navigation data (e.g., standard and/or default navigation data) (block 206). An example process that may be used to implement block 206 of the example method 200 of FIG. 2 is described in greater detail below in connection with FIG. 3. Following block 206, control of the example method 200 of FIG. 2 proceeds to block 216.

At block 208, the mode detector 134 of FIG. 1 determines whether the detected operational mode is an assistive learning mode (block 208). If the mode detector 134 determines at block 208 that the detected operational mode is an assistive learning mode, control of the example method 200 of FIG. 2 proceeds to block 210. If the mode detector 134 instead determines at block 208 that the operational mode is not an assistive learning mode, control of the example method 200 of FIG. 2 proceeds to block 212.

At block 210, the adaptive driver assistance apparatus 102 of FIG. 1 generates a driver record including driver assistance data based on performance data (e.g., a driver record associated with a driver of the vehicle 100 of FIG. 1) (block 206). An example process that may be used to implement block 210 of the example method 200 of FIG. 2 is described in greater detail below in connection with FIG. 4. Following block 210, control of the example method 200 of FIG. 2 proceeds to block 216.

At block 212, the mode detector 134 of FIG. 1 determines whether the detected operational mode is an assistive driving mode (block 212). If the mode detector 134 determines at block 212 that the detected operational mode is an assistive driving mode, control of the example method 200 of FIG. 2 proceeds to block 214. If the mode detector 134 instead determines at block 212 that the operational mode is not an assistive driving mode, control of the example method 200 of FIG. 2 returns to block 202.

At block 214, the adaptive driver assistance apparatus 102 of FIG. 1 presents adapted navigation data (e.g., navigation data that is adapted relative to the normal navigation data) based on driver assistance data (block 206). An example process that may be used to implement block 214 of the example method 200 of FIG. 2 is described in greater detail below in connection with FIG. 5. Following block 214, control of the example method 200 of FIG. 2 proceeds to block 216.

At block 216, the adaptive driver assistance apparatus 102 of FIG. 1 determines whether to continue operating (block 216). For example, the navigation engine 112 or the assistance engine 114 of FIG. 1, and/or, more generally, the adaptive driver assistance apparatus 102 of FIG. 1, may receive data, information, and/or one or more instruction(s) via the user interface 108 of FIG. 1 indicating that the driver assistance apparatus 102 is to cease operating. If the adaptive driver assistance apparatus 102 determines at block 216 that it is to continue operating, control of the example method 200 of FIG. 2 returns to block 202. If the adaptive driver assistance apparatus 102 instead determines at block 216 that it is not to continue operating, the example method 200 of FIG. 2 ends.

Figure 3:
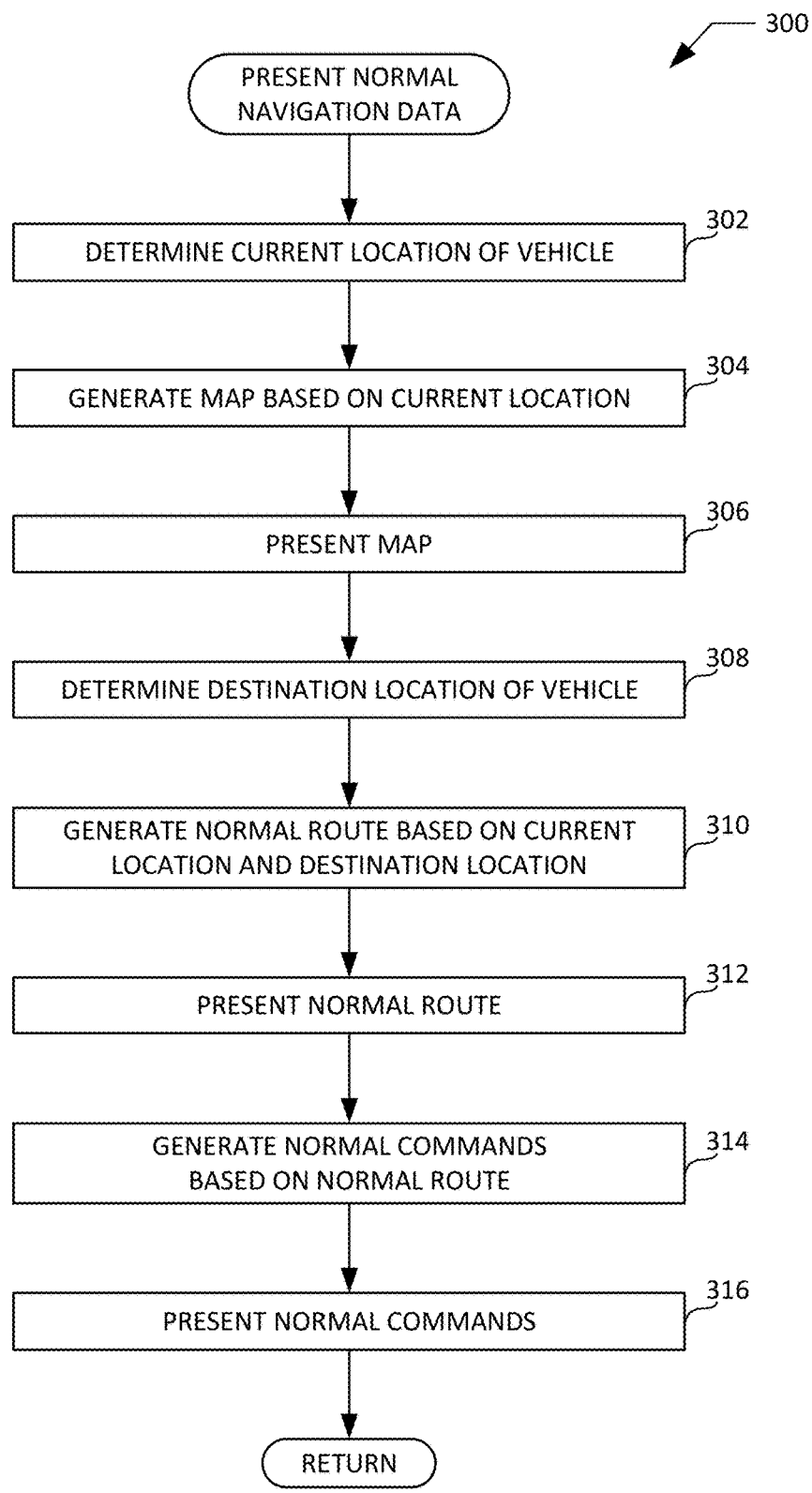
FIG. 3 is a flowchart representative of an example method that may be executed at the example adaptive driver assistance apparatus of FIG. 1 to present normal navigation data to a driver of the vehicle of FIG. 1.

FIG. 3 is a flowchart representative of an example method 300 that may be executed at the example adaptive driver assistance apparatus 102 of FIG. 1 to present normal navigation data to a driver of the vehicle 100 of FIG. 1. Example operations of blocks 302, 304, 306, 308, 310, 312, 314 and 316 of FIG. 3 may be used to implement block 206 of FIG. 2.

The example method 300 of FIG. 3 begins when the navigation engine 112 of FIG. 1 determines a current location of a vehicle (block 302). For example, the navigation engine 112 may determine the current location of the vehicle 100 of FIG. 1 based on location data identified and/or derived from signal(s) collected and/or received by the GPS receiver 126 of FIG. 1. Following block 302, control of the example method 300 of FIG. 3 proceeds to block 304.

At block 304, the map generator 128 of FIG. 1 generates a map based on the current location of the vehicle (block 304). For example, the map generator 128 may generate a map including a graphical representation and/or indication of the current location of the vehicle based on the location data identified and/or derived from the signal(s) collected and/or received by the GPS receiver 126 of FIG. 1. In some examples, the map generated by the map generator 128 corresponds to and/or represents one or more geographic area(s) that are common and/or overlapping with respect to the current location of the vehicle 100 and/or the location data. Following block 304, control of the example method 300 of FIG. 3 proceeds to block 306.

At block 306, the user interface 108 of FIG. 1 presents the map (block 306). For example, the user interface 108 may present the map in a graphical format to a driver of the vehicle 100 of FIG. 1 via one or more of the output device(s) 120 of the user interface 108 of FIG. 1. Following block 306, control of the example method 300 of FIG. 3 proceeds to block 308.

At block 308, the navigation engine 112 of FIG. 1 determines a destination location of the vehicle (block 308). For example, the navigation engine 112 may determine a destination location of the vehicle 100 of FIG. 1 based on one or more input(s) and/or instruction(s) received via the user interface 108 of FIG. 1. Following block 308, control of the example method 300 of FIG. 3 proceeds to block 310.

At block 310, the route generator 130 of FIG. 1 generates a normal route based on the current location and the destination location of the vehicle (block 310). For example, the route generator 130 may generate the normal route based on the current location of the vehicle 100 of FIG. 1 identified and/or derived from the signal(s) collected and/or received by the GPS receiver 126 of FIG. 1, and further based on the destination location identified and/or received via the user interface 108 of FIG. 1. Following block 310, control of the example method 300 of FIG. 3 proceeds to block 312.

At block 312, the user interface 108 of FIG. 1 presents the normal route (block 312). For example, the user interface 108 may present the normal route in a graphical format to a driver of the vehicle 100 of FIG. 1 via one or more of the output device(s) 120 of the user interface 108 of FIG. 1. The normal route may be presented in a manner such that the normal route is overlaid, superimposed, and/or otherwise incorporated into and/or onto the map when the map is presented at the user interface 108 of FIG. 1. Following block 312, control of the example method 300 of FIG. 3 proceeds to block 314.

At block 314, the command generator 132 of FIG. 1 generates normal commands based on the normal route (block 314). For example, the command generator 132 may generate the normal commands based on the normal route generated by the route generator 130 of FIG. 1 and/or presented by the user interface 108 of FIG. 1. Following block 314, control of the example method 300 of FIG. 3 proceeds to block 316.

At block 316, the user interface 108 of FIG. 1 presents the normal commands (block 316). For example, the user interface 108 may present the normal commands in an audible and/or graphical format to a driver of the vehicle 100 of FIG. 1 via one or more of the output device(s) 120 of the user interface 108 of FIG. 1. The normal commands may be presented in a manner such that the sequence, the frequency, and/or the timing of the normal commands coincide with specific location(s) of the vehicle 100 of FIG. 1 relative to the normal route presented at the user interface 108 of FIG. 1. Following block 316, the example method 300 of FIG. 3 ends and control returns to a calling function or process such as the example method 200 of FIG. 2.

Figure 4:
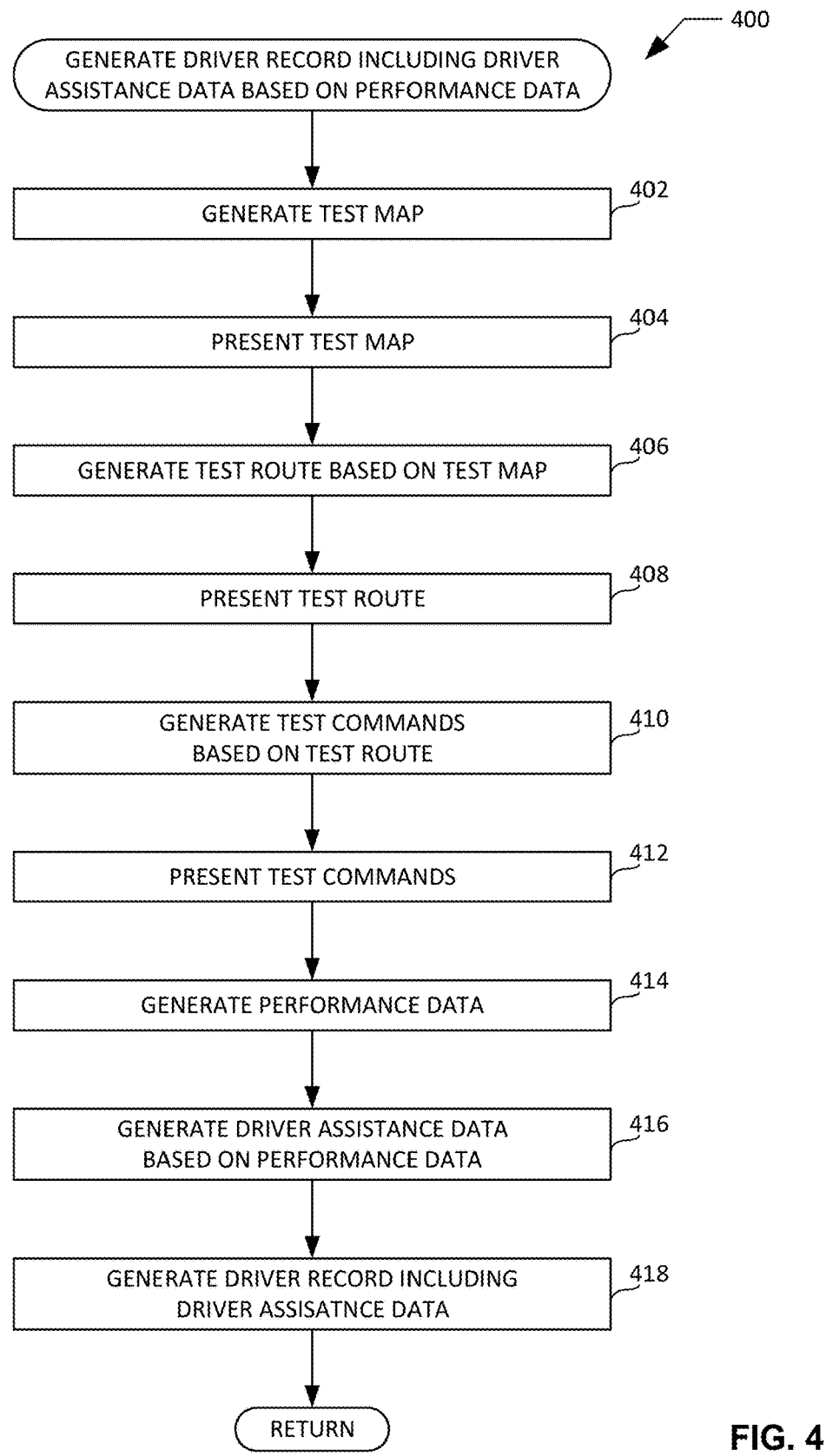
FIG. 4 is a flowchart representative of an example method that may be executed at the example adaptive driver assistance apparatus of FIG. 1 to generate a driver record for a driver of the vehicle of FIG. 1.

FIG. 4 is a flowchart representative of an example method 400 that may be executed at the example adaptive driver assistance apparatus 102 of FIG. 1 to generate a driver record for a driver of the vehicle 100 of FIG. 1. The driver record includes driver assistance data based on performance data. Example operations of blocks 402, 404, 406, 408, 410, 412, 414, 416 and 418 of FIG. 4 may be used to implement block 210 of FIG. 2.

The example method 400 of FIG. 4 begins when the map generator 128 of FIG. 1 generates a test map (block 402). For example, the map generator 128 may generate a test map associated with a simulated driving experience based on one or more input(s) and/or instruction(s) received from the simulator 136 of FIG. 1. Following block 402, control of the example method 400 of FIG. 4 proceeds to block 404.

At block 404, the user interface 108 of FIG. 1 presents the test map (block 404). For example, the user interface 108 may present the test map in a graphical format to a driver of the vehicle 100 of FIG. 1 via one or more of the output device(s) 120 of the user interface 108 of FIG. 1. Following block 404, control of the example method 400 of FIG. 4 proceeds to block 406.

At block 406, the route generator 130 of FIG. 1 generates a test route based on the test map (block 406). For example, the route generator 130 may generate a test route associated with the test map and the simulated driving experience based on one or more input(s) and/or instruction(s) received from the simulator 136 of FIG. 1. Following block 406, control of the example method 400 of FIG. 4 proceeds to block 408.

At block 408, the user interface 108 of FIG. 1 presents the test route (block 408). For example, the user interface 108 may present the test route in a graphical format to a driver of the vehicle 100 of FIG. 1 via one or more of the output device(s) 120 of the user interface 108 of FIG. 1. The test route may be presented in a manner such that the test route is overlaid, superimposed, and/or otherwise incorporated into and/or onto the test map when the test map is presented at the user interface 108 of FIG. 1. In some examples, the test route may be presented via the user interface 108 of FIG. 1 while the vehicle 100 is stationary (e.g., while the vehicle 100 is running and parked) based on the simulated driving experience managed and/or controlled by the simulator 136 of FIG. 1. Following block 408, control of the example method 400 of FIG. 4 proceeds to block 410.

At block 410, the command generator 132 of FIG. 1 generates test commands based on the test route (block 410). For example, the command generator 132 may generate test commands associated with the test route and the simulated driving experience based on one or more input(s) and/or instruction(s) received from the simulator 136 of FIG. 1. Following block 410, control of the example method 400 of FIG. 4 proceeds to block 412.

At block 412, the user interface 108 of FIG. 1 presents the test commands (block 412). For example, the user interface 108 may present the test commands in an audible and/or graphical format to a driver of the vehicle 100 of FIG. 1 via one or more of the output device(s) 120 of the user interface 108 of FIG. 1. The test commands may be presented in a manner such that the sequence, the frequency, and/or the timing of the test commands coincide with specific simulated location(s) of the vehicle 100 of FIG. 1 relative to the test route presented at the user interface 108 of FIG. 1. In some examples, the test commands may be presented via the user interface 108 of FIG. 1 while the vehicle 100 is stationary (e.g., while the vehicle 100 is running and parked) based on the simulated driving experience managed and/or controlled by the simulator 136 of FIG. 1. Following block 412, control of the example method 400 of FIG. 4 proceeds to block 414.

At block 414, the performance evaluator 138 of FIG. 1 generates performance data (block 414). For example, the performance evaluator 138 may track maneuvers (e.g., steering wheel movements, brake pedal movements, accelerator pedal movements, etc.) of the vehicle 100 of FIG. 1 relative to target maneuvers (e.g., expected maneuvers) associated with the test route generated by the route generator 130 of FIG. 1 and/or the test commands generated by the command generator 132 of FIG. 1. The performance evaluator 138 may generate performance data indicative of instances in which the tracked maneuvers of the vehicle 100 of FIG. 1 deviate, depart, and/or stray from the target maneuvers associated with the test route generated by the route generator 130 of FIG. 1 and/or the test command(s) generated by the command generator 132 of FIG. 1. Following block 414, control of the example method 400 of FIG. 4 proceeds to block 416.

At block 416, the driver requirements generator 140 of FIG. 1 generates driver assistance data based on the performance data (block 416). For example, the driver requirements generator 140 may generate driver assistance data (e.g., driver-specific route requirements, driver-specific command requirements, etc.) based on the performance data generated by the performance evaluator 138 of FIG. 1. The driver assistance data generated by the driver requirements generator 140 is to adapt the normal navigation data to be generated, managed and/or controlled by the navigation engine 112 of FIG. 1 to assist a driver having a developmental disability and/or a cognitive impairment as indicated by the performance data. In some examples, the driver requirements generator 140 generates driver assistance data including one or more driver-specific route requirement(s) and/or one or more driver-specific command requirement(s) that are optimized in terms of the sequence, the frequency, and/or the timing associated with routes (e.g., adapted routes) and/or commands (e.g., adapted commands) to be provided to the driver of the vehicle 100 of FIG. 1 as the driver performs one or more driving maneuvers (e.g., turning, changing lanes, braking, accelerating, etc.). The driver requirements generator 140 may optimize the route requirement(s) and/or the command requirement(s) of the driver assistance data to enable the driver to provide an appropriate response to (e.g., to comply with and/or adhere to) a route and/or commands presented to the driver via the user interface 108 of FIG. 1 as the vehicle 100 of FIG. 1 travels from its current location to a destination location. Following block 416, control of the example method 400 of FIG. 4 proceeds to block 418.

At block 418, the driver record generator 142 of FIG. 1 generates a driver record including the driver assistance data. For example, the driver record generator 142 may generate a driver record for a driver of the vehicle 100 of FIG. 1 including the driver assistance data generated for the driver by the driver requirements generator 140 of FIG. 1. In some examples, the driver record generated by the driver record generator 142 may additionally include driver identification data received via the user interface 108 of FIG. 1, or received from the mobile device 106 of FIG. 1 via the network interface 110 of FIG. 1. In such examples, the driver record generated by the driver record generator 142 of FIG. 1 may associate the driver identification data with the driver assistance data such that the driver assistance data, and/or, more generally, the driver record, is linked to and/or otherwise corresponds to a specific driver of the vehicle 100 of FIG. 1. Following block 418, the example method 400 of FIG. 4 ends and control returns to a calling function or process such as the example method 200 of FIG. 2.

Figure 5:
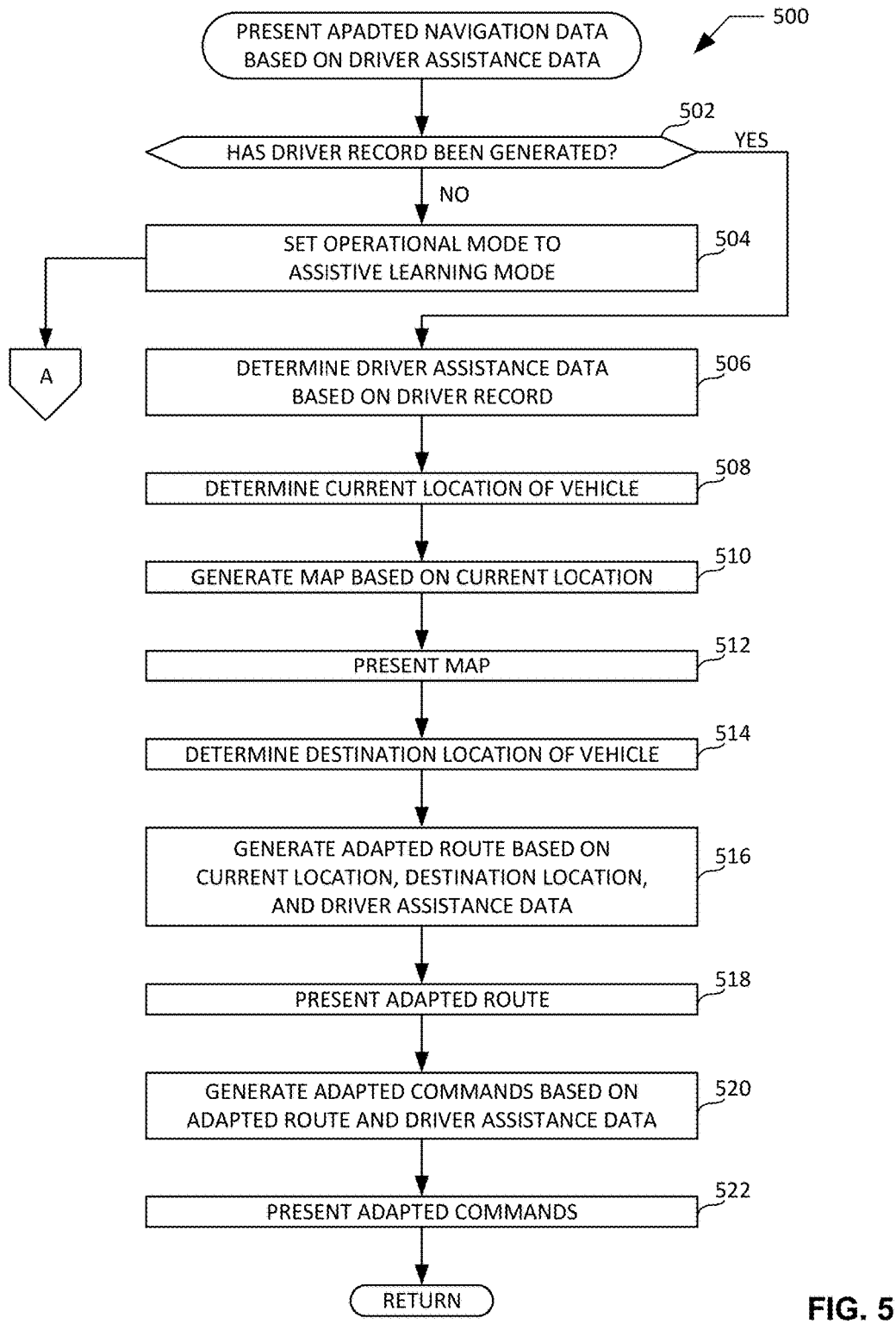
FIG. 5 is a flowchart representative of an example method that may be executed at the example adaptive driver assistance apparatus of FIG. 1 to present adapted navigation data to assist a developmentally disabled or cognitively impaired driver of the vehicle of FIG. 1.

FIG. 5 is a flowchart representative of an example method 500 that may be executed at the example adaptive driver assistance apparatus 102 of FIG. 1 to present adapted navigation data to assist a developmentally disabled or cognitively impaired driver of the vehicle 100 of FIG. 1. The adapted navigation data is based on driver assistance data. Example operations of blocks 502, 504, 506, 508, 510, 512, 514, 516, 518, 520 and 522 of FIG. 5 may be used to implement block 214 of FIG. 2.

The example method 500 of FIG. 5 begins when the assistance engine 114 of FIG. 1 determines whether a driver record has been generated (block 502). For example, the assistance engine 114 may determine that the driver record generator 142 of FIG. 1 has generated a driver record that is linked to and/or otherwise corresponds to the driver of the vehicle 100 of FIG. 1. If the navigation engine 112 determines at block 502 that a driver record has not been generated, control of the example method 500 of FIG. 5 proceeds to block 504. If the navigation engine 112 instead determines at block 502 that a driver record has been generated, control of the example method 500 of FIG. 5 proceeds to block 506.

At block 504, the assistance engine 114 of FIG. 1 sets the operational mode of the adaptive driver assistance apparatus 102 of FIG. 1 to an assistive learning mode (block 504). For example, the assistance controller 144 and/or, more generally, the assistance engine 114 of FIG. 1 may generate one or more control signal(s) that instruct and/or otherwise cause the user interface 108 of FIG. 1 and/or the mode detector 134 of FIG. 1 to set the operational mode of the adaptive driver assistance apparatus 102 to an assistive learning mode. Following block 504, the example method 500 of FIG. 5 ends and control returns to a calling function or process such as block 202 of the example method 200 of FIG. 2.

At block 506, the assistance engine 114 of FIG. 1 determines driver assistance data based on a driver record (block 506). For example, the assistance engine 114 may identify and/or determine driver assistance data (e.g., driver specific route requirements, driver-specific command requirements, etc.) generated by the driver requirements generator 140 of FIG. 1 and/or stored within a driver record generated by the driver record generator 142 of FIG. 1, and associated with the driver and/or with the vehicle 100 of FIG. 1. Following block 506, control of the example method 500 of FIG. 5 proceeds to block 508.

At block 508, the navigation engine 112 of FIG. 1 determines a current location of a vehicle (block 508). For example, the navigation engine 112 may determine the current location of the vehicle 100 of FIG. 1 based on location data identified and/or derived from signal(s) collected and/or received by the GPS receiver 126 of FIG. 1. Following block 508, control of the example method 500 of FIG. 5 proceeds to block 510.

At block 510, the map generator 128 of FIG. 1 generates a map based on the current location of the vehicle (block 510). For example, the map generator 128 may generate a map including a graphical representation and/or indication of the current location of the vehicle based on the location data identified and/or derived from the signal(s) collected and/or received by the GPS receiver 126 of FIG. 1. In some examples, the map generated by the map generator 128 corresponds to and/or represents one or more geographic area(s) that are common and/or overlapping with respect to the current location of the vehicle 100 and/or the location data. Following block 510, control of the example method 500 of FIG. 5 proceeds to block 512.

At block 512, the user interface 108 of FIG. 1 presents the map (block 512). For example, the user interface 108 may present the map in a graphical format to a driver of the vehicle 100 of FIG. 1 via one or more of the output device(s) 120 of the user interface 108 of FIG. 1. Following block 512, control of the example method 500 of FIG. 5 proceeds to block 514.

At block 514, the navigation engine 112 of FIG. 1 determines a destination location of the vehicle (block 514). For example, the navigation engine 112 may determine a destination location of the vehicle 100 of FIG. 1 based on one or more input(s) and/or instruction(s) received via the user interface 108 of FIG. 1. Following block 514, control of the example method 500 of FIG. 5 proceeds to block 516.

At block 516, the route generator 130 of FIG. 1 generates an adapted route based on the current location and the destination location of the vehicle, and further based on the driver assistance data (block 516). For example, the route generator 130 may generate the adapted route based on the current location of the vehicle 100 of FIG. 1 identified and/or derived from the signal(s) collected and/or received by the GPS receiver 126 of FIG. 1 and the destination location identified and/or received via the user interface 108 of FIG. 1, and further based on the driver assistance data generated by the driver requirements generator 140 of FIG. 1. Following block 516, control of the example method 500 of FIG. 5 proceeds to block 518.

At block 518, the user interface 108 of FIG. 1 presents the adapted route (block 518). For example, the user interface 108 may present the adapted route in a graphical format to a driver of the vehicle 100 of FIG. 1 via one or more of the output device(s) 120 of the user interface 108 of FIG. 1. The adapted route may be presented in a manner such that the adapted route is overlaid, superimposed, and/or otherwise incorporated into and/or onto the map when the map is presented at the user interface 108 of FIG. 1. Following block 518, control of the example method 500 of FIG. 5 proceeds to block 520.

At block 520, the command generator 132 of FIG. 1 generates adapted commands based on the adapted route and further based on the driver assistance data (block 520). For example, the command generator 132 may generate the adapted commands based on the adapted route generated by the route generator 130 of FIG. 1 and/or presented by the user interface 108 of FIG. 1, and further based on the driver assistance data generated by the driver requirements generator 140 of FIG. 1. Following block 520, control of the example method 500 of FIG. 5 proceeds to block 522.

At block 522, the user interface 108 of FIG. 1 presents the adapted commands (block 522). For example, the user interface 108 may present the adapted commands in an audible and/or graphical format to a driver of the vehicle 100 of FIG. 1 via one or more of the output device(s) 120 of the user interface 108 of FIG. 1. The adapted commands may be presented in a manner such that the sequence, the frequency, and/or the timing of the adapted commands coincide with specific location(s) of the vehicle 100 of FIG. 1 relative to the adapted route presented at the user interface 108 of FIG. 1. Following block 522, the example method 500 of FIG. 5 ends and control returns to a calling function or process such as the example method 200 of FIG. 2.

Figure 6:
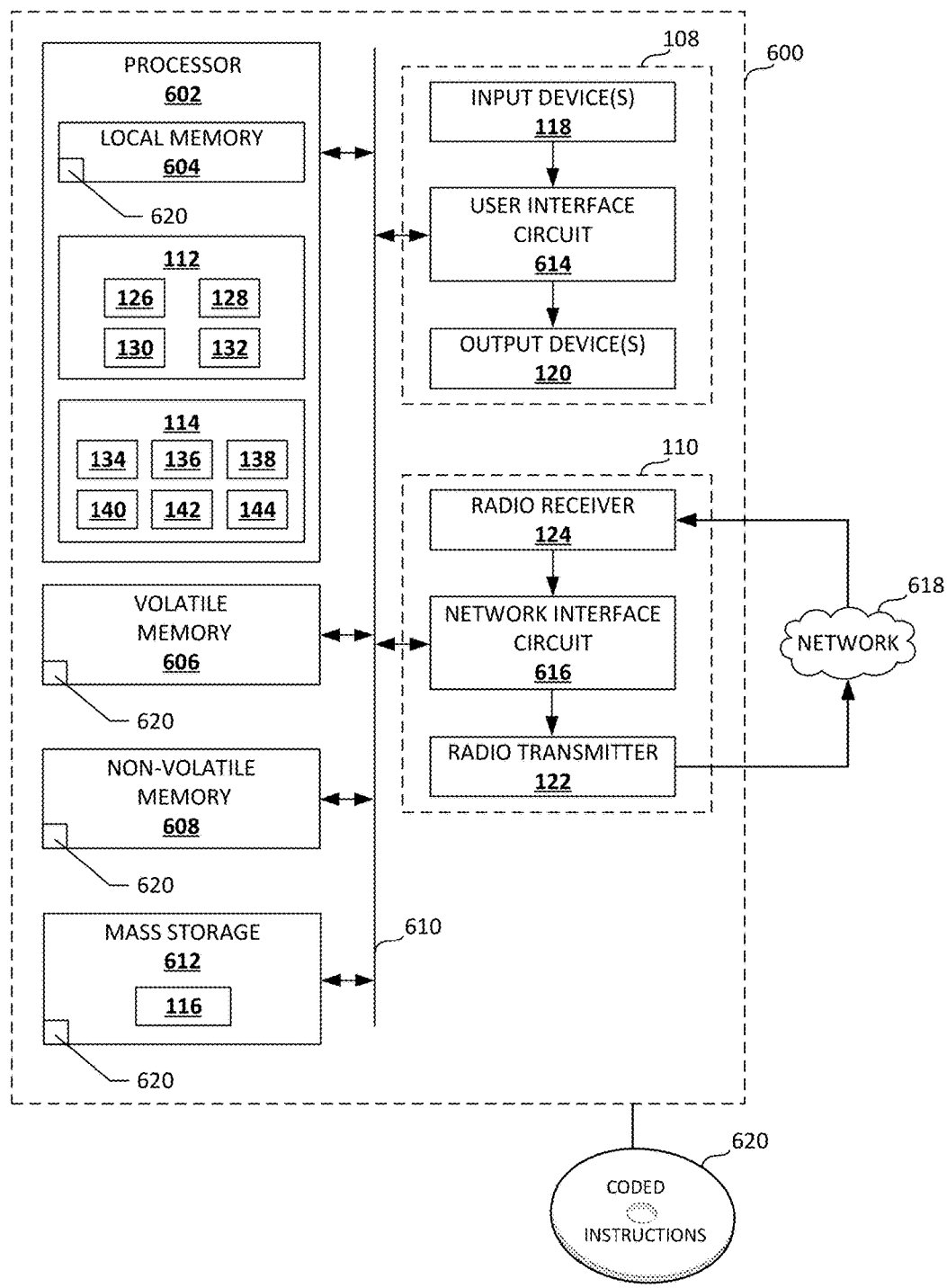
FIG. 6 is an example processor platform capable of executing instructions to implement the example methods of FIGS. 2-5 and the example adaptive driver assistance apparatus of FIG. 1.

FIG. 6 is a block diagram of an example processor platform 600 capable of executing instructions to implement the example methods 200, 300, 400, 500 of FIGS. 2-5 and the example adaptive driver assistance apparatus 102 of FIG. 1. The processor platform 600 of the illustrated example includes a processor 602. The processor 602 of the illustrated example is hardware. For example, the processor 602 can be implemented by one or more integrated circuit(s), logic circuit(s), microprocessor(s) or controller(s) from any desired family or manufacturer. In the example of FIG. 6, the processor 602 implements the example navigation engine 112, the example assistance engine 114, the example GPS receiver 126, the example map generator 128, the example route generator 130, the example command generator 132, the example mode detector 134, the example simulator 136, the example performance evaluator 138, the example driver requirements generator 140, the example driver record generator 142, and the example assistance controller 144 of FIG. 1. The processor 602 of the illustrated example also includes a local memory 604 (e.g., a cache).

The processor 602 of the illustrated example is in communication with a main memory including a volatile memory 606 and a non-volatile memory 608 via a bus 610 (e.g., a CAN bus). The volatile memory 606 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 608 may be implemented by flash memory and/or any other desired type of memory device. Access to the volatile memory 606 and the non-volatile memory 608 is controlled by a memory controller.

The processor 602 of the illustrated example is also in communication with one or more mass storage device(s) 612 for storing software and/or data. Examples of such mass storage devices 612 include floppy disk drives, hard drive disks, compact disk drives, Blu-ray disk drives, RAID systems, and digital versatile disk (DVD) drives. In the illustrated example, the mass storage device 612 includes the example memory 116 of FIG. 1.

The processor platform 600 of the illustrated example also includes a user interface circuit 614. The user interface circuit 614 may be implemented by any type of interface standard, such as an Ethernet interface, a universal serial bus (USB), and/or a PCI express interface. In the illustrated example, one or more input device(s) 118 are connected to the user interface circuit 614. The input device(s) 118 permit(s) a user to enter data and commands into the processor 602. The input device(s) 118 can be implemented by, for example, an audio sensor, a camera (still or video), a keyboard, a button, a mouse, a touchscreen, a track-pad, a trackball, isopoint, a voice recognition system, a microphone, and/or a liquid crystal display. One or more output device(s) 120 are also connected to the user interface circuit 614 of the illustrated example. The output device(s) 120 can be implemented, for example, by a light emitting diode, an organic light emitting diode, a liquid crystal display, a touchscreen and/or a speaker. The user interface circuit 614 of the illustrated example may, thus, include a graphics driver such as a graphics driver chip and/or processor. In the illustrated example, the input device(s) 118, the output device(s) 120, and the user interface circuit 614 collectively form the example user interface 108 of FIG. 1.

The processor platform 600 of the illustrated example also includes a network interface circuit 616. The network interface circuit 616 may be implemented by any type of interface standard, such as an Ethernet interface, a universal serial bus (USB), and/or a PCI express interface. The network interface circuit 616 of the illustrated example is connected to the example radio transmitter 122 and the example radio receiver 124 of FIG. 1 to facilitate the exchange of data and/or signals with external machines (e.g., the mobile device 106 of FIG. 1, other vehicles, etc.) via a network 618 (e.g., a wireless network, a cellular network, etc.). In the illustrated example, the radio transmitter 122, the radio receiver 124, and the network interface circuit 616 collectively form the example network interface 110 of FIG. 1.

Coded instructions 620 for implementing the example method 200 of FIG. 2, the example method 300 of FIG. 3, the example method 400 of FIG. 4, and/or the example method 500 of FIG. 5 may be stored in the local memory 604, in the volatile memory 606, in the non-volatile memory 608, in the mass storage device 612, and/or on a removable tangible computer readable storage medium such as a CD or DVD.

From the foregoing, it will be appreciated that the disclosed methods and apparatus for adaptively assisting developmentally disabled or cognitively impaired drivers advantageously provide adaptive driving assistance that is personalized and/or tailored to the specific functional difficulties of the developmentally disabled or cognitively impaired driver. The disclosed methods and apparatus accordingly enhance and/or expand the abilities of individuals having a developmental disability or a cognitive impairment to safely operate and/or drive a vehicle. Such enhanced and/or expanded driving abilities may advantageously provide individuals having a developmental disability or a cognitive disorder with greater independence in their daily lives, and may also potentially increase their chances of working jobs and raising families.

In some examples, an apparatus is disclosed. In some disclosed examples, the apparatus comprises a user interface. In some disclosed examples, the user interface is to present first navigation data in a first mode to assist a driver in guiding a vehicle from a current location to a destination location. In some disclosed examples, the user interface is further to present second navigation data in a second mode to assist the driver in guiding the vehicle from the current location to the destination location. In some disclosed examples, the second navigation data is adapted relative to the first navigation data based on driver assistance data associated with the driver. In some disclosed examples, the driver assistance data is based on a developmental disability or a cognitive impairment of the driver.

In some disclosed examples of the apparatus, the first navigation data includes first commands, and the second navigation data includes second commands. In some disclosed examples, the second commands are adapted relative to the first commands based on the driver assistance data. In some disclosed examples, the first commands and the second commands are to be presented via the user interface in an audible format.

In some disclosed examples of the apparatus, the first navigation data includes a first route and the second navigation data includes a second route. In some disclosed examples, the second route is adapted relative to the first route based on the driver assistance data. In some disclosed examples, the first navigation data includes first commands based on the first route, and the second navigation data includes second commands based on the second route. In some disclosed examples, the second commands are adapted relative to the first commands based on differences between the first route and the second route.

In some disclosed examples, the apparatus further comprises a simulator to provide a simulated driving experience to the driver via the user interface in a third mode. In some disclosed examples, the simulator is to collect maneuver data associated with vehicle maneuvers to be performed by the driver in response to the simulated driving experience. In some disclosed examples, the apparatus further comprises a performance evaluator to generate performance data associated with the driver based on the maneuver data. In some disclosed examples, the apparatus further comprises a driver requirements generator to generate the driver assistance data associated with the driver based on the performance data. In some disclosed examples, the apparatus further comprises a driver record generator to generate a driver record associated with the driver. In some disclosed examples, the driver record is to include the driver assistance data and driver identification data associated with the driver.

In some examples, a method for providing adaptive driver assistance is disclosed. In some disclosed examples, the method comprises presenting first navigation data via a user interface in a first mode to assist a driver in guiding a vehicle from a current location to a destination location. In some disclosed examples, the method further comprises presenting second navigation data via the user interface in a second mode to assist the driver in guiding the vehicle from the current location to the destination location. In some disclosed examples, the second navigation data is adapted relative to the first navigation data based on driver assistance data associated with the driver. In some disclosed examples, the driver assistance data is based on a developmental disability or a cognitive impairment of the driver.

In some disclosed examples of the method, the first navigation data includes first commands, and the second navigation data includes second commands. In some disclosed examples, the second commands are adapted relative to the first commands based on the driver assistance data. In some disclosed examples, the first commands and the second commands are to be presented via the user interface in an audible format.

In some disclosed examples of the method, the first navigation data includes a first route and the second navigation data includes a second route. In some disclosed examples, the second route is adapted relative to the first route based on the driver assistance data. In some disclosed examples, the first navigation data includes first commands based on the first route, and the second navigation data includes second commands based on the second route. In some disclosed examples, the second commands are adapted relative to the first commands based on differences between the first route and the second route.

In some disclosed examples, the method further comprises presenting a simulated driving experience to the driver via the user interface in a third mode. In some disclosed examples, the method further comprises collecting maneuver data associated with vehicle maneuvers to be performed by the driver in response to the simulated driving experience. In some disclosed examples, the method further comprises generating performance data associated with the driver based on the maneuver data. In some disclosed examples, the method further comprises generating the driver assistance data associated with the driver based on the performance data. In some disclosed examples, the method further comprises generating a driver record associated with the driver. In some disclosed examples, the driver record is to include the driver assistance data and driver identification data associated with the driver.

In some examples, a non-transitory machine readable storage medium comprising instructions is disclosed. In some disclosed examples, the instructions, when executed, cause a processor to present first navigation data via a user interface in a first mode to assist a driver in guiding a vehicle from a current location to a destination location. In some disclosed examples, the instructions, when executed, further cause the processor to present second navigation data via the user interface in a second mode to assist the driver in guiding the vehicle from the current location to the destination location. In some disclosed examples, the second navigation data is adapted relative to the first navigation data based on driver assistance data associated with the driver. In some disclosed examples, the driver assistance data is based on a developmental disability or a cognitive impairment of the driver.

In some disclosed examples of the non-transitory machine readable storage medium, the first navigation data includes first commands, and the second navigation data includes second commands. In some disclosed examples, the second commands are adapted relative to the first commands based on the driver assistance data. In some disclosed examples, the first commands and the second commands are to be presented via the user interface in an audible format.

In some disclosed examples of the non-transitory machine readable storage medium, the first navigation data includes a first route and the second navigation data includes a second route. In some disclosed examples, the second route is adapted relative to the first route based on the driver assistance data. In some disclosed examples, the first navigation data includes first commands based on the first route, and the second navigation data includes second commands based on the second route. In some disclosed examples, the second commands are adapted relative to the first commands based on differences between the first route and the second route.

In some disclosed examples of the non-transitory machine readable storage medium, the instructions, when executed, further cause the processor to present a simulated driving experience to the driver via the user interface in a third mode. In some disclosed examples, the instructions, when executed, further cause the processor to collect maneuver data associated with vehicle maneuvers to be performed by the driver in response to the simulated driving experience. In some disclosed examples, the instructions, when executed, further cause the processor to generate performance data associated with the driver based on the maneuver data. In some disclosed examples, the instructions, when executed, further cause the processor to generate the driver assistance data associated with the driver based on the performance data. In some disclosed examples, the instructions, when executed, further cause the processor to generate a driver record associated with the driver. In some disclosed examples, the driver record is to include the driver assistance data and driver identification data associated with the driver.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A vehicle, comprising:
   a processor of an adaptive driver assistance apparatus, the processor configured to:
      determine an operational mode of the adaptive driver assistance apparatus, the operational mode being selectively set to one of a normal mode, an assistive driving mode, or an assistive learning mode;
      generate, in response to determining that the operational mode is set to the normal mode, first navigation data to assist a first driver in guiding the vehicle from a first location to a second location;
      determine, in response to determining that the operational mode is set to the assistive driving mode, whether a driver record associated with a second driver is accessible to the adaptive driver assistance apparatus, the driver record including driver identification data that uniquely identifies the second driver, driver disability data that identifies a developmental disability or a cognitive impairment of the second driver, and personalized driver assistance data tailored to the driver disability data of the second driver;
      generate, in response to determining that the driver record is accessible to the adaptive driver assistance apparatus, second navigation data to assist the second driver in guiding the vehicle from the first location to the second location, the second navigation data being adapted relative to the first navigation data based on the personalized driver assistance data; and
      set the operational mode from the assistive driving mode to the assistive learning mode in response to determining that the driver record is not accessible to the adaptive driver assistance apparatus, the assistive learning mode to invoke an in-vehicle simulated driving experience to generate a new driver record associated with the second driver; and
   a user interface of the adaptive driver assistance apparatus operatively coupled to the processor, the user interface configured to present the first navigation data to the first driver, to present the second navigation data to the second driver, and to present the in-vehicle simulated driving experience to the second driver.

2. The vehicle of claim 1, wherein the processor is further configured to:
   generate performance data as the second driver guides the vehicle between the first location and the second location, the performance data identifying at least one deviation between a movement of the vehicle and a target movement associated with the second navigation data; and
   in response to determining that the at least one deviation violates a threshold, generate a control signal to invoke an autonomous driving mechanism of the vehicle.

3. The vehicle of claim 2, wherein the processor is further configured to generate the control signal in response to determining that at least one of a facial expression or a physiological response of the second driver acquired via the user interface is indicative of a need for automated driving assistance.

4. The vehicle of claim 1, wherein the processor is further configured to:
   generate performance data as the second driver guides the vehicle between the first location and the second location, the performance data identifying at least one deviation between a movement of the vehicle and a target movement associated with the second navigation data; and
   in response to determining that the at least one deviation violates a threshold:
      generate updated personalized driver assistance data based on the at least one deviation; and
      update the driver record based on the updated personalized driver assistance data.

5. The vehicle of claim 1, wherein the first navigation data includes first commands and the second navigation data includes second commands, the second commands being adapted relative to the first commands based on the personalized driver assistance data.

6. The vehicle of claim 1, wherein the first navigation data includes a first route and the second navigation data includes a second route, the second route being adapted relative to the first route based on the personalized driver assistance data.

7. The vehicle of claim 1, further comprising a simulator of the adaptive driver assistance apparatus, the simulator configured to:

provide the in-vehicle simulated driving experience to the second driver via the user interface while the vehicle is stationary and the operational mode is set to the assistive learning mode; and collect maneuver data associated with simulated vehicle maneuvers to be performed by the second driver in response to the in-vehicle simulated driving experience;

wherein the processor is operatively coupled to the simulator, the processor further configured to generate the personalized driver assistance data of the driver record based on the maneuver data.

8. A method, comprising:

determining, via a processor of an adaptive driver assistance apparatus of a vehicle, an operational mode of the adaptive driver assistance apparatus, the operational mode being selectively set to one of a normal mode, an assistive driving mode, or an assistive learning mode;

generating, via the processor in response to determining that the operational mode is set to the normal mode, first navigation data to assist a first driver in guiding the vehicle from a first location to a second location;

presenting the first navigation data to the first driver via a user interface of the adaptive driver assistance apparatus, the user interface operatively coupled to the processor;

determining, via the processor in response to determining that the operational mode is set to the assistive driving mode, whether a driver record associated with a second driver is accessible to the adaptive driver assistance apparatus, the driver record including driver identification data that uniquely identifies the second driver, driver disability data that identifies a developmental disability or a cognitive impairment of the second driver, and personalized driver assistance data tailored to the driver disability data of the second driver;

generating, via the processor in response to determining that the driver record is accessible to the adaptive driver assistance apparatus, second navigation data to assist the second driver in guiding the vehicle from the first location to the second location, the second navigation data being adapted relative to the first navigation data based on the personalized driver assistance data;

presenting the second navigation data to the second driver via the user interface;

setting the operational mode from the assistive driving mode to the assistive learning mode in response to determining that the driver record is not accessible to the adaptive driver assistance apparatus, the assistive learning mode to invoke an in-vehicle simulated driving experience to generate a new driver record associated with the second driver; and presenting the in-vehicle simulated driving experience to the second driver via the user interface.

9. The method of claim 8, further comprising:

generating, via the processor, performance data as the second driver guides the vehicle between the first location and the second location, the performance data identifying at least one deviation between a movement of the vehicle and a target movement associated with the second navigation data; and in response to determining that the at least one deviation violates a threshold, generating, via the processor, a control signal to invoke an autonomous driving mechanism of the vehicle.

10. The method of claim 9, wherein the generating of the control signal is further in response to determining, via the processor, that at least one of a facial expression or a physiological response of the second driver acquired via the user interface is indicative of a need for automated driving assistance.

11. The method of claim 8, further comprising:

generating, via the processor, performance data as the second driver guides the vehicle between the first location and the second location, the performance data identifying at least one deviation between a movement of the vehicle and a target movement associated with the second navigation data; and in response to determining that the at least one deviation violates a threshold:

generating, via the processor, updated personalized driver assistance data based on the at least one deviation; and updating, via the processor, the driver record based on the updated personalized driver assistance data.

12. The method of claim 8, wherein the first navigation data includes first commands and the second navigation data includes second commands, the second commands being adapted relative to the first commands based on the personalized driver assistance data.

13. The method of claim 8, wherein the first navigation data includes a first route and the second navigation data includes a second route, the second route being adapted relative to the first route based on the personalized driver assistance data.

14. The method of claim 8, further comprising:

providing the in-vehicle simulated driving experience to the second driver via the user interface while the vehicle is stationary and the operational mode is set to the assistive learning mode;

collecting maneuver data associated with simulated vehicle maneuvers to be performed by the second driver in response to the in-vehicle simulated driving experience; and generating, via the processor, the personalized driver assistance data of the driver record based on the maneuver data.

15. A non-transitory machine readable storage medium comprising instructions that, when executed, cause a processor of an adaptive driver assistance apparatus of a vehicle to at least:

determine an operational mode of the adaptive driver assistance apparatus, the operational mode being selectively set to one of a normal mode, an assistive driving mode, or an assistive learning mode;

generate, in response to determining that the operational mode is set to the normal mode, first navigation data to assist a first driver in guiding the vehicle from a first location to a second location;

present the first navigation data to the first driver via a user interface of the adaptive driver assistance apparatus;

determine, in response to determining that the operational mode is set to the assistive driving mode, whether a driver record associated with a second driver is accessible to the adaptive driver assistance apparatus, the driver record including driver identification data that uniquely identifies the second driver, driver disability data that identifies a developmental disability or a cognitive impairment of the second driver, and personalized driver assistance data tailored to the driver disability data of the second driver;

generate, in response to determining that the driver record is accessible to the adaptive driver assistance apparatus, second navigation data to assist the second driver in guiding the vehicle from the first location to the second location, the second navigation data being adapted relative to the first navigation data based on the personalized driver assistance data;

present the second navigation data to the second driver via the user interface;

set the operational mode from the assistive driving mode to the assistive learning mode in response to determining that the driver record is not accessible to the adaptive driver assistance apparatus, the assistive learning mode to invoke an in-vehicle simulated driving experience to generate a new driver record associated with the second driver; and present the in-vehicle simulated driving experience to the second driver via the user interface.

16. The non-transitory machine readable storage medium of claim 15, wherein the instructions, when executed, further cause the machine to:

generate performance data as the second driver guides the vehicle between the first location and the second location, the performance data identifying at least one deviation between a movement of the vehicle and a target movement associated with the second navigation data; and in response to determining that the at least one deviation violates a threshold, generate a control signal to invoke an autonomous driving mechanism of the vehicle.

17. The non-transitory machine readable storage medium of claim 15, wherein the instructions, when executed, further cause the machine to:

generate performance data as the second driver guides the vehicle between the first location and the second location, the performance data identifying at least one deviation between a movement of the vehicle and a target movement associated with the second navigation data; and in response to determining that the at least one deviation violates a threshold:
  generate updated personalized driver assistance data based on the at least one deviation; and
  update the driver record based on the updated personalized driver assistance data.

18. The non-transitory machine readable storage medium of claim 15, wherein the first navigation data includes first commands and the second navigation data includes second commands, the second commands being adapted relative to the first commands based on the personalized driver assistance data.

19. The non-transitory machine readable storage medium of claim 15, wherein the first navigation data includes a first route and the second navigation data includes a second route, the second route being adapted relative to the first route based on the personalized driver assistance data.

20. The non-transitory machine readable storage medium of claim 15, wherein the instructions, when executed, further cause the machine to:

provide the in-vehicle simulated driving experience to the second driver via the user interface while the vehicle is stationary and the operation mode is set to the assistive learning mode;

collect maneuver data associated with simulated vehicle maneuvers to be performed by the second driver in response to the in-vehicle simulated driving experience; and generating the personalized driver assistance data of the driver record based on the maneuver data.

* * * * *